United States Patent
Kando

(10) Patent No.: US 7,785,198 B2
(45) Date of Patent: Aug. 31, 2010

(54) GAME APPARATUS AND GAME PROGRAM PROVIDING LEAD CHARACTER AND SUB CHARACTER GROUP MOVEMENT

(75) Inventor: Yuuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 525 days.

(21) Appl. No.: 11/089,334

(22) Filed: Mar. 25, 2005

(65) Prior Publication Data
US 2005/0221880 A1     Oct. 6, 2005

(30) Foreign Application Priority Data
Mar. 31, 2004   (JP)   .............. 2004-106875

(51) Int. Cl.
*A63F 13/00* (2006.01)
*G06G 3/20* (2006.01)
*G06G 5/22* (2006.01)
*G06G 5/32* (2006.01)
*G06G 5/42* (2006.01)

(52) U.S. Cl. .................... 463/30; 461/31; 345/473
(58) Field of Classification Search ............ 463/1, 463/7–8, 11, 30–33, 43–44; 345/474, 473, 345/475
See application file for complete search history.

(56) References Cited

U.S. PATENT DOCUMENTS

| 6,525,736 | B1 * | 2/2003 | Erikawa et al. ............. 345/473 |
| 6,729,954 | B2 | 5/2004 | Atsumi et al. |
| 6,736,724 | B1 * | 5/2004 | Erikawa et al. ................ 463/7 |
| 6,870,537 | B2 * | 3/2005 | Kikuchi et al. ............. 345/474 |
| 2001/0026265 | A1 * | 10/2001 | Kikuchi et al. ............. 345/157 |
| 2002/0045470 | A1 * | 4/2002 | Atsumi et al. .................. 463/1 |
| 2002/0049690 | A1 * | 4/2002 | Takano ......................... 706/47 |
| 2002/0082064 | A1 * | 6/2002 | Hillman ......................... 463/4 |
| 2004/0021667 | A1 * | 2/2004 | Tsuda ........................ 345/474 |
| 2004/0038739 | A1 | 2/2004 | Wanat |
| 2005/0119050 | A1 | 6/2005 | Suzuki |

FOREIGN PATENT DOCUMENTS

JP        07244743 A   *   9/1995

(Continued)

OTHER PUBLICATIONS

Dave C. Pottinger, Implementing Coordinated Movement, Jan. 29, 199, Game Developer Magazine, pp. 1-17, http://www.gamasutra.com/features/19990129/implementing_01.htm, □□.*

(Continued)

*Primary Examiner*—Dmitry Suhol
*Assistant Examiner*—Damon Pierce
(74) *Attorney, Agent, or Firm*—Nixon & Vanderhye P.C.

(57) ABSTRACT

A plurality of slots are set in a game space with reference to the current location of a leader character, and one slot is correlated with one sub character. Each sub character is controlled so as to move it from the current location toward the corresponding slot. As the leader character moves, so too does each slot. Thus, it is possible to provide a video game in which the leader character's movement is controlled by a player and a plurality of sub characters' movements are controlled by a predetermined algorithm so as to follow the leader character to move in formation in a natural manner.

19 Claims, 20 Drawing Sheets

| | FOREIGN PATENT DOCUMENTS | | | JP | 2002-143557 | 5/2002 |
|---|---|---|---|---|---|---|
| JP | 08063613 A | * | 6/1996 | | | |
| JP | 10080576 A | * | 6/1998 | | | |
| JP | 2000-172868 | | 6/2000 | | | |
| JP | 2001056870 A | * | 2/2001 | | | |
| JP | 2002-85845 | | 3/2002 | | | |

OTHER PUBLICATIONS

Blizzard Entertainment, StarCraft game manual, 1998.*
Sega Genesis, Sonic the Hedgehog 2, gamefaqs, Jun. 12, 2003.*

* cited by examiner

| SLOT NUMBER | RELATIVE COORDINATES (CHARACTER COORDINATE SYSTEM) |
|---|---|
| 1 | $(SXp1, SZp1)$ |
| 2 | $(SXp2, SZp2)$ |
| ... | ... |
| 35 | $(SXp35, SZp35)$ |

SPACE COORDINATE SYSTEM

LEADER CHARACTER (LXg, LYg, LZg)

GROUND

| SUB CHARACTER | SLOT NUMBER |
|---|---|
| 1 | 1 |
| 2 | 2 |
| 3 | 3 |
| ... | ... |
| 35 | 35 |

GAME APPARATUS AND GAME PROGRAM PROVIDING LEAD CHARACTER AND SUB CHARACTER GROUP MOVEMENT

FIELD OF THE INVENTION

The exemplary illustrative embodiments herein relate to a game apparatus and, more particularly, to a game which moves a plurality of characters such that a character operated by a player is followed by a plurality of other characters.

BACKGROUND AND SUMMARY OF THE INVENTION

Japanese Laid-Open Patent Publication No. 2002-85845 discloses a game apparatus in which a main character is followed by a subordinate character.

Japanese Laid-Open Patent Publication No. 2000-172868 discloses a game apparatus in which a plurality of characters move in a group.

The game apparatus disclosed in the first reference includes only one subordinate character, whereby it is impossible to move a plurality of subordinate characters so as to follow a main character.

In the game apparatus disclosed in the second reference, individual characters determine their own traveling directions independently, which makes it difficult to set a single destination. As a result, it is impossible to move the characters in formation, or rearrange the formation of the characters.

Also, the game apparatuses disclosed in these references do not consider the need for a character which cannot move forward due to an obstacle (e.g., topographic features, etc.) to detour around the obstacle. However, the processing load will be increased if an appropriate detouring route has to be determined depending on the situation (e.g., a location of the character or information on the topographic features around the character, etc.) every time an obstacle blocks the character's path.

Therefore, certain exemplary illustrative embodiments provide a game apparatus that is capable of moving a plurality of characters in a natural manner while solving at least one of the above-described or other problems.

Certain exemplary illustrative embodiments have the following aspects to attain the features mentioned above (references in parentheses indicate exemplary elements which can be found in the exemplary illustrative embodiments that follow, though such notes are not intended to limit the scope of the invention).

A first aspect of certain exemplary illustrative embodiments is directed to a game apparatus for executing a game having a first character (leader character) and a plurality of second characters (sub characters) appearing therein. The game apparatus comprises an operation unit (20), first character movement control means (22, S18), destination coordinates setting means (22, S40), correlating means (FIG. 10, 78), and second character movement control means (22, S20).

The first character movement control means controls a movement of the first character in a game space based on an operation by the operation unit, and sets first character coordinates which are coordinates of the first character in the game space. The destination coordinates setting means sets a plurality of destination coordinates (slot coordinates) in the game with reference to the first character coordinates set by the first character movement control means (FIG. 5). The correlating means correlates each of the plurality of second characters with any of the plurality of destination coordinates. The second character movement control means controls a movement of each of the plurality of second characters such that each second character moves toward the destination coordinates with which the second character is correlated by the correlating means, and sets second character coordinates which are coordinates of the second character in the game space (FIG. 11). The second character movement control means controls the second character so as to move toward the destination coordinates based on a predetermined algorithm. The predetermined algorithm may cause the second character to move toward the destination coordinates in a linear manner, or may cause the second character to move toward the destination coordinates in a non-linear manner. The predetermined algorithm may calculate a path to the destination coordinates, and causes the second character to move toward the destination coordinates along the calculated path. Alternatively, the predetermined algorithm may cause the second character to move toward the destination coordinates while detouring around an obstacle.

According to a second aspect, in the first aspect, the second character movement control means determines a traveling direction of each second character based on the current second character coordinates and the destination coordinates with which the second character is correlated by the correlating means.

According to a third aspect, in the first aspect, the game apparatus further comprises relative coordinate storage means (16, FIG. 6) for storing relative coordinates of the plurality of destination coordinates with reference to the first character coordinates. When the first character coordinates are changed by the first character movement control means, the destination coordinates setting means re-sets the plurality of destination coordinates in the game space based on the changed first character coordinates and the relative coordinates stored in the relative coordinate storage means.

According to a fourth aspect, in the first aspect, the game apparatus further comprises footstep coordinate storage means (22, S36) for storing the first character coordinates set by the first character movement control means as footstep coordinates; and first determination means (22, S52) for determining whether or not each second character is able to move toward the destination coordinates with which the second character is correlated by the correlating means. The second character movement control means moves the second character unable to move toward the destination coordinates, with which the second character is correlated by the correlating means, based on the footstep coordinates stored by the footstep coordinate storage means (FIGS. 15 and 16). More specifically, the first determination means may detect the presence of an obstacle (fixed object, topographic object, and the like) in the traveling direction determined by the second character movement control means. The footstep coordinate storage means may store footstep coordinates in such a manner that new footstep coordinates are preferentially stored. In this case, a predetermined number of footstep coordinates may be stored. Alternatively, footstep coordinates in a predetermined time period may be stored.

According to a fifth aspect, in the fourth aspect, the second character movement control means moves the second character unable to move toward the destination coordinates, with which the second character is correlated by the correlating means, toward footstep coordinates closest to a current location of the second character, the footstep coordinates being included in the footstep coordinates stored by the footstep coordinate storage means (FIG. 15).

According to a sixth aspect, in the fourth aspect, the footstep coordinate storage means stores the footstep coordinates together with time information (frame number) (FIG. 14).

The time information indicates a time at which the footstep coordinates are stored or a time period during which the first character is present at the footstep coordinates. When the second character moving based on the footstep coordinates stored by the footstep coordinate storage means arrives at the footstep coordinates, the second character movement control means sets footstep coordinates, which are stored by the footstep coordinate storage means after the footstep coordinates at which the second character has arrived, to destination footstep coordinates, and moves the second character toward the destination footstep coordinates (FIG. 18).

According to a seventh aspect, in the sixth aspect, the game apparatus further comprises second determination means (22, S76) for determining whether or not the second character moving based on the footstep coordinates stored by the footstep coordinate storage means is able to move toward the destination footstep coordinates specified by the second character movement control means. The second character movement control means moves the second character unable to move toward the destination footstep coordinates toward footstep coordinates other than the destination footstep coordinates specified by the second character movement control means, the footstep coordinates being stored by the footstep coordinate storage means after the footstep coordinates at which the second character has arrived.

According to an eighth aspect, in the fourth aspect, when the second character moving based on the footstep coordinates satisfies predetermined requirements, the second character movement control means moves the second character toward the destination coordinates. The predetermined requirements are satisfied when the second character can move toward the corresponding destination coordinates, for example. Alternatively, it may be determined that the predetermined requirements are satisfied when the second character can move toward the destination coordinates in a linear manner (due to the absence of the obstacle between the current coordinates and the destination coordinates), or another algorithm may be used for determining whether or not the second character can move toward the destination coordinates.

According to a ninth aspect, in the fourth aspect, when the second character moving based on the footstep coordinates is within a predetermined distance from the destination coordinates, with which the second character is correlated by the correlating means, the second character movement control means moves the second character toward the destination coordinates (FIG. 17).

A tenth aspect of certain exemplary illustrative embodiments is directed to a computer-readable recording medium for recording a game program causing a computer (22), which is electrically connected to an operation unit (20), to execute a game having a first character and a plurality of second characters appearing therein. The game program causes the computer to function as: first character movement control means (22, S18), destination coordinates setting means (22, S40), correlating means (FIG. 10, 78), and second character movement control means (22, S20).

The first character movement control means controls a movement of the first character in a game space based on an operation by the operation unit, and sets first character coordinates which are coordinates of the first character in the game space. The destination coordinates setting means sets a plurality of destination coordinates (slot coordinates) in the game space with reference to the first character coordinates set by the first character movement control means. The correlating means correlates each of the plurality of second characters with any of the plurality of destination coordinates. The second character movement control means controls a movement of each of the plurality of second characters such that each second character moves toward the destination coordinates with which the second character is correlated by the correlating means, and sets second character coordinates which are coordinates of the second character in the game space (FIG. 11).

According to the first aspect, a movement operation for the first character enables autonomous movement control of the second character based on the first character coordinates. Thus, it is possible to perform concurrent movement control for a plurality of characters. Also, the second character need not always located at the destination coordinates but may be autonomously controlled so as to move toward the destination coordinates, whereby each second character moves depending on the individual situation. Thus, it is possible to control the movement of the second characters in such a natural manner that each second character moves as if by its own will. Also, a settable destination realizes such a control that a particular second character moves toward a desired place.

According to the second aspect, each second character can arrive at the corresponding destination coordinates in the shortest distance.

According to the third aspect, it is possible to set destination coordinates while retaining a positional relationship of a plurality of destination coordinates. Thus, it is possible to realize such a movement control that a plurality of second characters move in formation.

According to the fourth aspect, when the second character cannot move toward the corresponding destination coordinates (due to collision with topographic features, etc.), it is possible to automatically perform such a control to avoid such a situation.

According to the fifth aspect, it is possible to effectively perform a detouring control.

According to the sixth aspect, the second character which is unable to move toward the destination coordinates and is away therefrom can come closer again to the destination coordinates in an efficient manner.

According to the seventh aspect, when the second character is unable to move toward the destination footstep coordinates, it is possible to automatically perform such a control to avoid such a situation.

According to the eighth and ninth aspects, it is possible to return the second character which is unable to move toward the destination coordinates and is away therefrom to the formation.

BRIEF DESCRIPTION OF THE DRAWINGS

These and other features and advantages will be better and more completely understood by reference to the following detailed description of exemplary illustrative embodiments in conjunction with the drawings of which.

DETAILED DESCRIPTION

Figure 1:
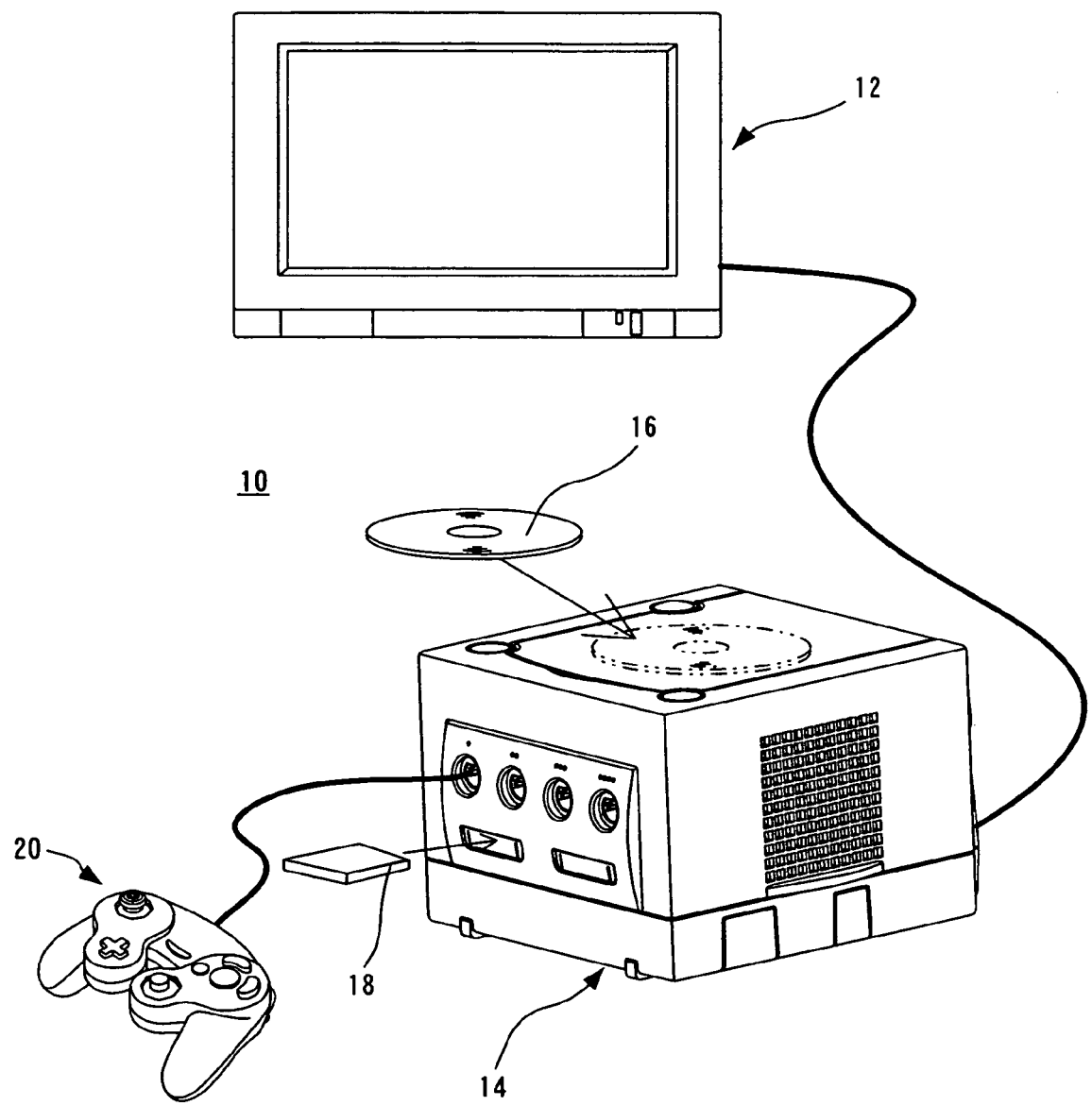
FIG. 1 is an external view of a game system 10.
Figure 2:
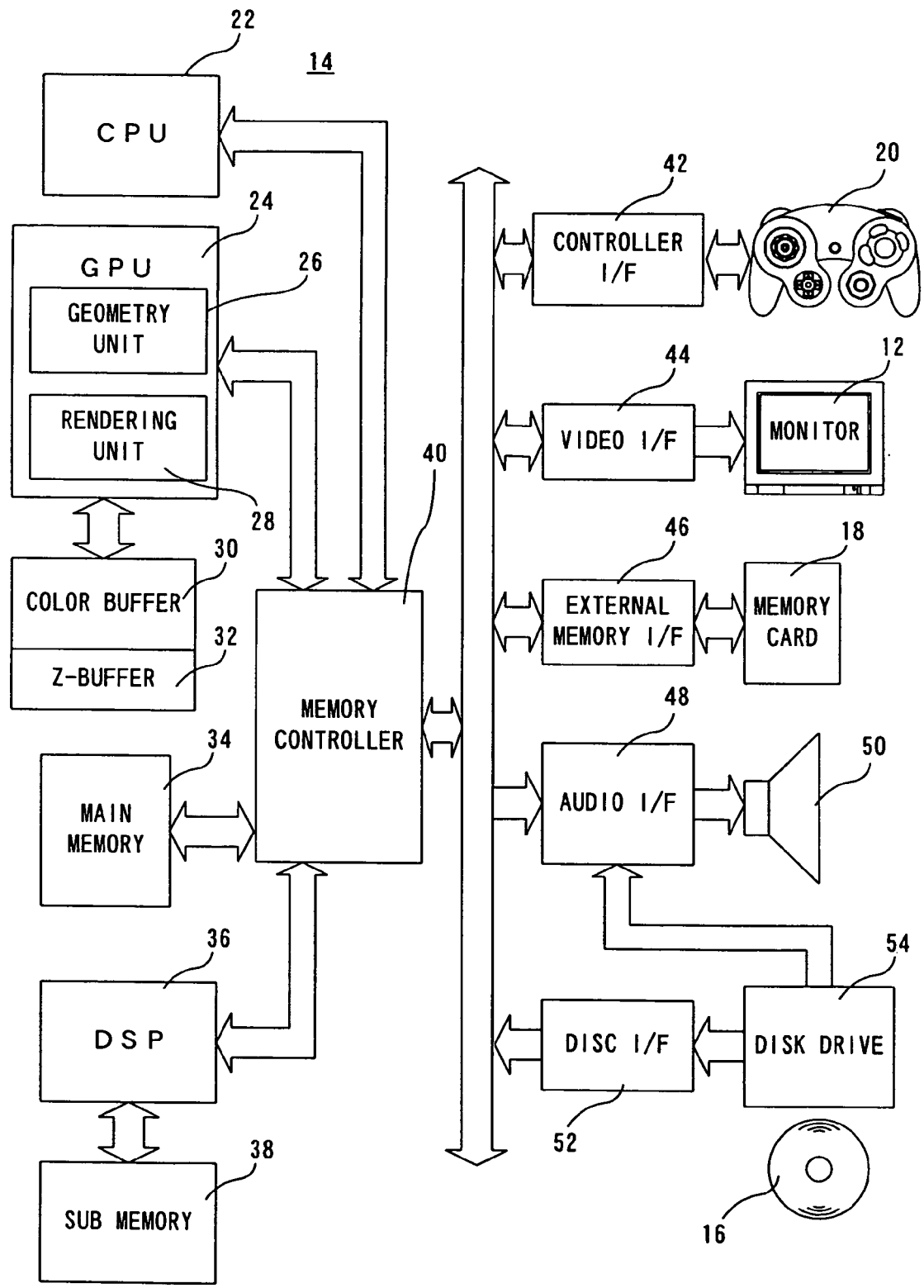
FIG. 2 is a block diagram showing an internal structure of a game main unit 14.

FIG. 1 is an external view showing a structure of a game system according to one exemplary illustrative embodiment, and FIG. 2 is a block diagram thereof. As shown in FIGS. 1 and 2, the game system 10 comprises a TV monitor 12, a game main unit 14, a DVD-ROM 16, an external memory card 18, and a controller 20. The DVD-ROM 16 and the external memory card 18 are removably mounted on/inserted in the game main unit 14. The controller 20 is connected to any one of a plurality of (in FIG. 1, four) controller port connectors provided in the game main unit 14 via a communication cable. The TV monitor 12 is connected to the game main unit 14 via an AV cable. Note that communication between the game main unit 14 and the controller 20 may be wireless communication.

The DVD-ROM 16 fixedly stores a game program, game data, and the like. The DVD-ROM 16 is mounted on the game main unit 14 when a player plays a game. In place of the DVD-ROM 16, the game program, etc., may be stored by using an external storage medium such as a CD-ROM, an MO, a memory card, a ROM cartridge, etc.

The external memory card 18, which is implemented by a rewritable storage medium such as a flash memory, etc., stores data such as save data of the game.

The game main unit 14 reads the program stored in the DVD-ROM 16, and performs a process in accordance with the read program.

The controller 20, which is an input device allowing the player to perform an input concerning a game operation, has a plurality of operation switches. The controller 20 outputs operation data to the game main unit 14 in response to depression, for example, of the operation switch exerted by the player.

The TV monitor 12 displays image data outputted from the game main unit 14 on a screen.

Next, referring to FIG. 2, the structure of the game main unit 14 will be described. In FIG. 2, the game main unit 14 has a CPU 22 and a memory controller 40 connected thereto. In the game main unit 14, the memory controller 40 is connected to a graphics processing unit (GPU) 24, a main memory 34, a DSP 36, and various interfaces (I/F) 42, 44, 46, 48, and 52. The memory controller 40 controls data transfer between the above-described components.

When the game is started, a disk drive 54 first drives the DVD-ROM 16 mounted on the game main unit 14. The game program stored in the DVD-ROM 16 is read into the main memory 34 via the disk I/F 52 and the memory controller 40. The game is started when the program on the main memory 34 is executed by the CPU 22. After the game is started, the player inputs a game operation, etc., to the controller 20 by using the operation switches. In accordance with the input by the player, the controller 20 outputs the operation data to the game main unit 14. The operation data outputted from the controller 20 is provided to the CPU 22 via the controller I/F 42 and the memory controller 40. The CPU 22 performs a game process according to the inputted operation data. The GPU 24 and the DSP 36 are used when, for example, image data is generated in the game process. Also, a sub memory 38 is used when the DSP 36 performs a process.

The GPU 24, which includes a geometry unit 26 and a rendering unit 28, is connected to a memory for image processing purposes. The memory for image processing purposes is used as a color buffer 30 or a Z-buffer 32, for example. The geometry unit 26 performs arithmetic computation for coordinates of a three-dimensional model (for example, an object composed of polygons) of an object and a graphic form placed in a game space, which is a virtual three-dimensional space. The geometry unit 26 performs, for example, rotation, scaling, and transformation of the three-dimensional model, and converts coordinates given in a world coordinate system to a viewpoint coordinate system or a screen coordinate system. The rendering unit 28 writes color data (RGB data) of each pixel into the color buffer 30, based on a predetermined texture with respect to the three-dimensional model projected onto the screen coordinates, thereby generating a game image. The color buffer 30 is a memory area reserved for storing the game image data (RGB data) generated by the rendering unit 28. The Z-buffer 32 is a memory area reserved for storing depth information from a viewpoint, which is lost when three-dimensional viewpoint coordinates are converted to two-dimensional screen coordinates. The GPU 24 generates image data to be displayed on the TV monitor 12 using these buffers, and appropriately outputs the image data to the TV monitor 12 via the memory controller 40 and the video I/F 44. Note that audio data, which is generated by the CPU 22 at the time of execution of the game program, is outputted from the memory controller 40 to the loud speaker 60 via the audio I/F 48. Note that, in certain exemplary illustrative embodiments, a memory for image processing purposes is additionally included in the hardware structure, but a method (e.g., UMA: Unified Memory Architecture) utilizing a portion of the main memory 34, for example, as a memory for image processing purposes may be used.

Next, based on the game program, a specific example of a game process executed by the CPU 22 will be described.

A game exemplified in certain exemplary illustrative embodiments allows the player to move a character appearing in the virtual game space by utilizing the controller 20. Other than the character operated by the player (herein after referred to as "a leader character"), a plurality of characters whose movement is controlled by a computer based on a predetermined algorithm (herein after referred to as "sub characters") are present in the game space. The plurality of sub characters are controlled so as to follow the leader character in a predetermined formation.

Figure 3:
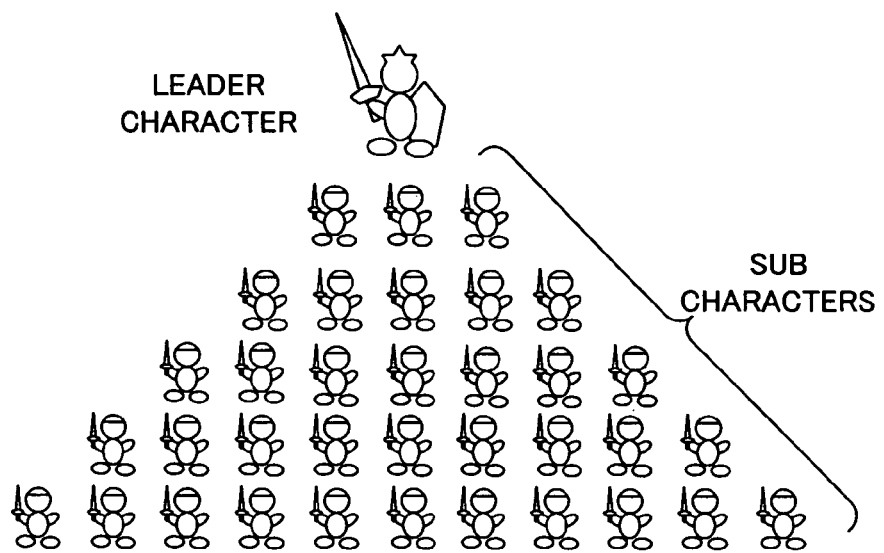
FIG. 3 is an illustration showing an exemplary formation comprising a leader character and sub characters.
Figure 4:
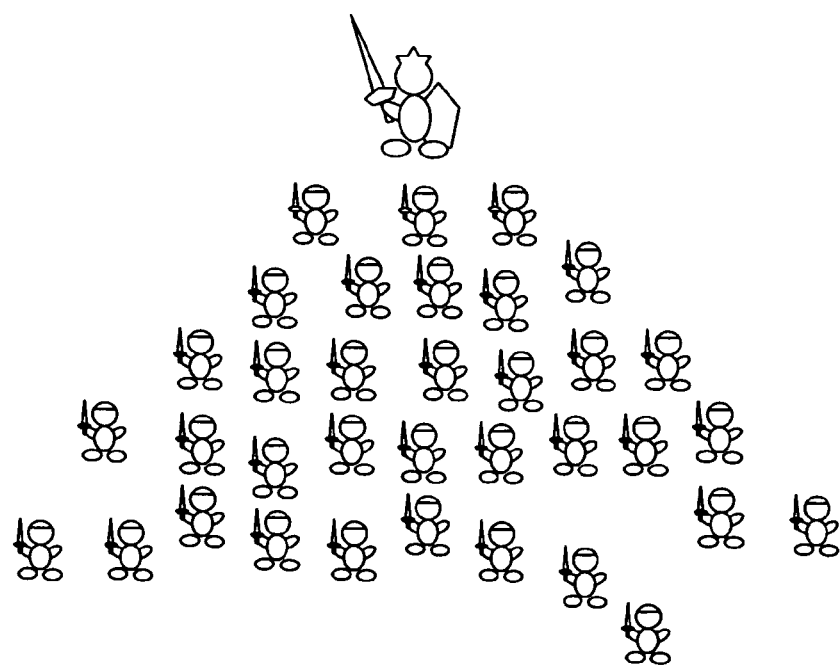
FIG. 4 is an illustration showing another exemplary formation comprising a leader character and sub characters.

FIG. 3 is an illustration showing an exemplary formation comprising a leader character and a plurality of sub characters following the leader character. In reality, however, the characters do not move in an orderly manner as shown in FIG. 3, but move in such a manner as shown in FIG. 4 due to a difference in traveling speed of sub characters or influences of topographic features since the movement of each sub character is controlled on an individual basis. When sufficient time has elapsed after the leader character has stopped moving, the sub characters are basically halted in the formation as shown in FIG. 3.

The above-described movement of the sub characters are realized by setting a plurality of destination points (herein after referred to as "slots") in the game space, correlating one sub character with one slot, and moving each sub character toward a corresponding slot. Each slot is set with reference to the location of the leader character. As the leader character moves, so does each slot.

Figures 5, 6:
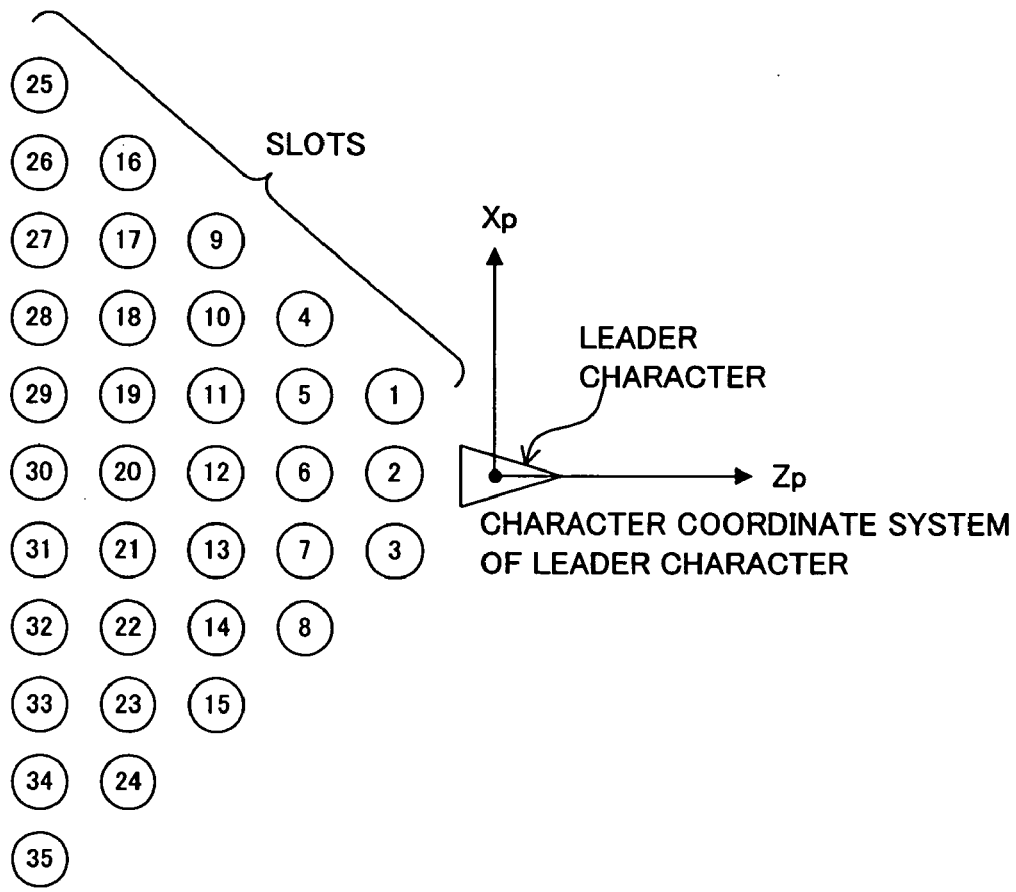
FIG. 5 is an illustration showing a positional relationship between a leader character and each slot.
FIG. 6 is a table showing exemplary relative coordinates sets for each slot.

FIG. 5 is an illustration showing a positional relationship between the leader character and a plurality of slots (slots 1 to 35). As shown in FIG. 5, the slots 1 to 35 are disposed behind the leader character in the direction opposite to the orientation (traveling direction) of the leader character. In certain exemplary illustrative embodiments, coordinates of the slots 1 to 35 are defined in a character coordinate system based on the leader character. FIG. 6 is a table showing the coordinates of each slot in the character coordinate system. The coordinates defined in FIG. 6 indicate not only coordinates in the character coordinate system but also relative coordinates based on the location of the leader character in a space coordinate system. That is, the coordinates of each slot changes along with a move or a change in the orientation (e.g., a position) of the leader character in the game space. In certain exemplary illustrative embodiments, a Y coordinate value of each slot is always zero in the character coordinate system. Thus, in the example shown in FIG. 6, the relative coordinates are defined by an Xp axis and a Zp axis of the character coordinate system, but it is not limited thereto. For example, the relative coordinates may be defined by the Xp axis, Yp axis, and Zp axis. The above-described relative coordinates are previously stored in the DVD-ROM 16 as game data. Note that the relative coordinates may be changed according to the player's preference or the game progress.

Coordinates of each slot in the game space (space coordinate system) are determined based on the coordinates and orientation of the leader character, relative coordinates of the slot, and inequalities of the ground. Hereinafter, an exemplary slot coordinates determination method will be described.

Figure 7:
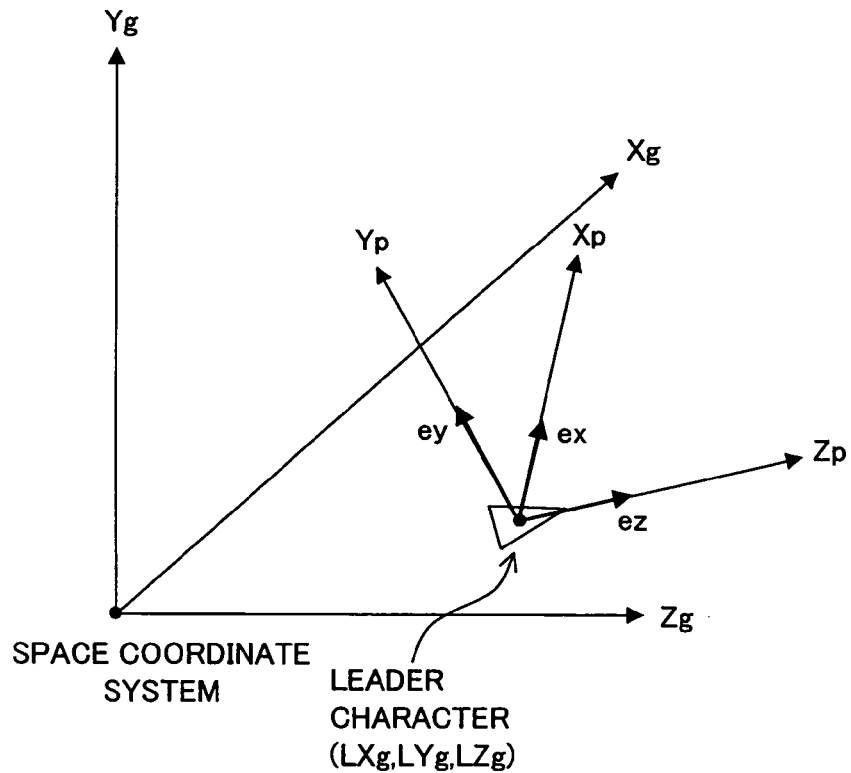
FIG. 7 is a graph showing a position vector of a leader character in a space coordinate system.

Firstly, as shown in FIG. 7, assume that three axes of the space coordinate system are Xg, Yg, and Zg, and a position matrix of the leader character is (ex, ey, ez) (where ex corresponds to a unit vector in a Xp axis direction; ey to a unit vector in a Yp axis direction; and ez to a unit vector in a Zp axis direction). Xp, Yp, and Zp axes in the space coordinate system correspond to XYZ axes in the character coordinate system.

In the case where coordinates of the leader character are: L=(LXg, LYg, LZg), and coordinates of the slot 1 are: Sg1=(SXg1, SYg1, SZg1), SXg1 and SZg1 are obtained by the following equation $$Sg1 = SXp1 \cdot ex + SZp1 \cdot ez + L. \quad (1)$$

SYg1 is equal to a Yg coordinate value of the ground corresponding to the SXg1 and SZg1 obtained by the above equation (1).

Figure 8:
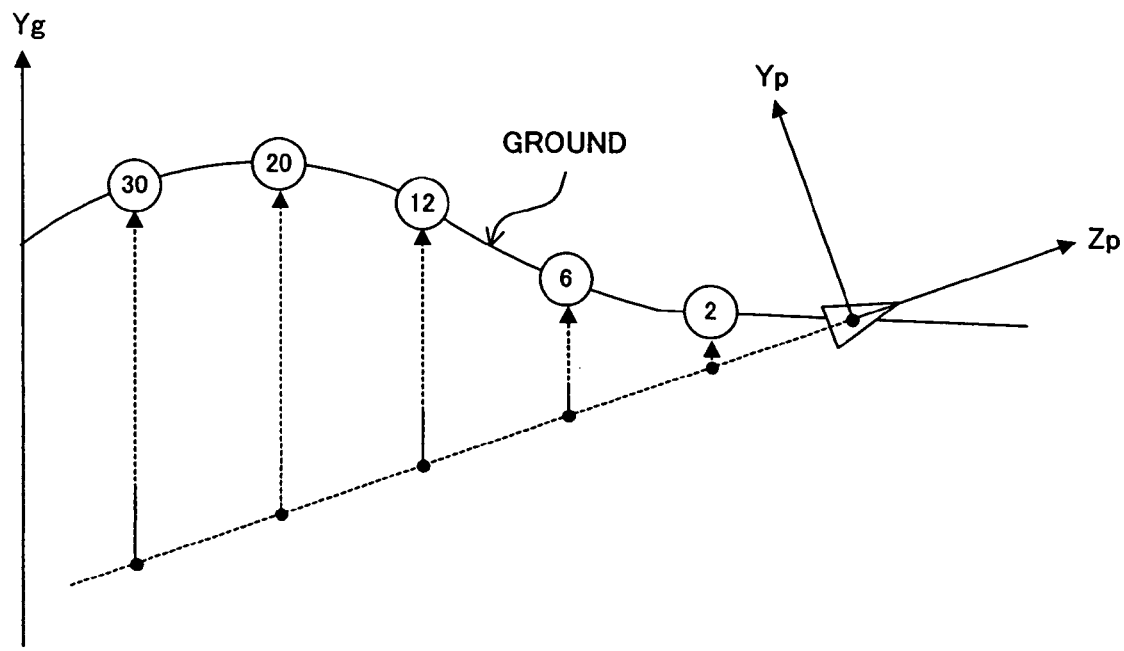
FIG. 8 is an illustration showing an exemplary method for determining a Yg axis coordinate of each slot.

As is the case with the slot 1, coordinates of the slots 2 to 35 are obtained in a similar manner. FIG. 8 is a lateral view of the game space schematically showing how coordinates of each slot are determined based on the coordinates and position of the leader character. Xp and Zp coordinates of each slot are set based on the above equation (1), and each slot is disposed on the surface of the corresponding ground.

In the case where the direction of the Yg axis is always the same as the direction of ey, that is, in the case where the leader character only rotates around the Yg axis, it is possible to calculate the slot coordinates more easily. Such a case is shown in FIG. 9, in which the directions of the Yg axis and ey are perpendicular to the page space.

Figure 9:
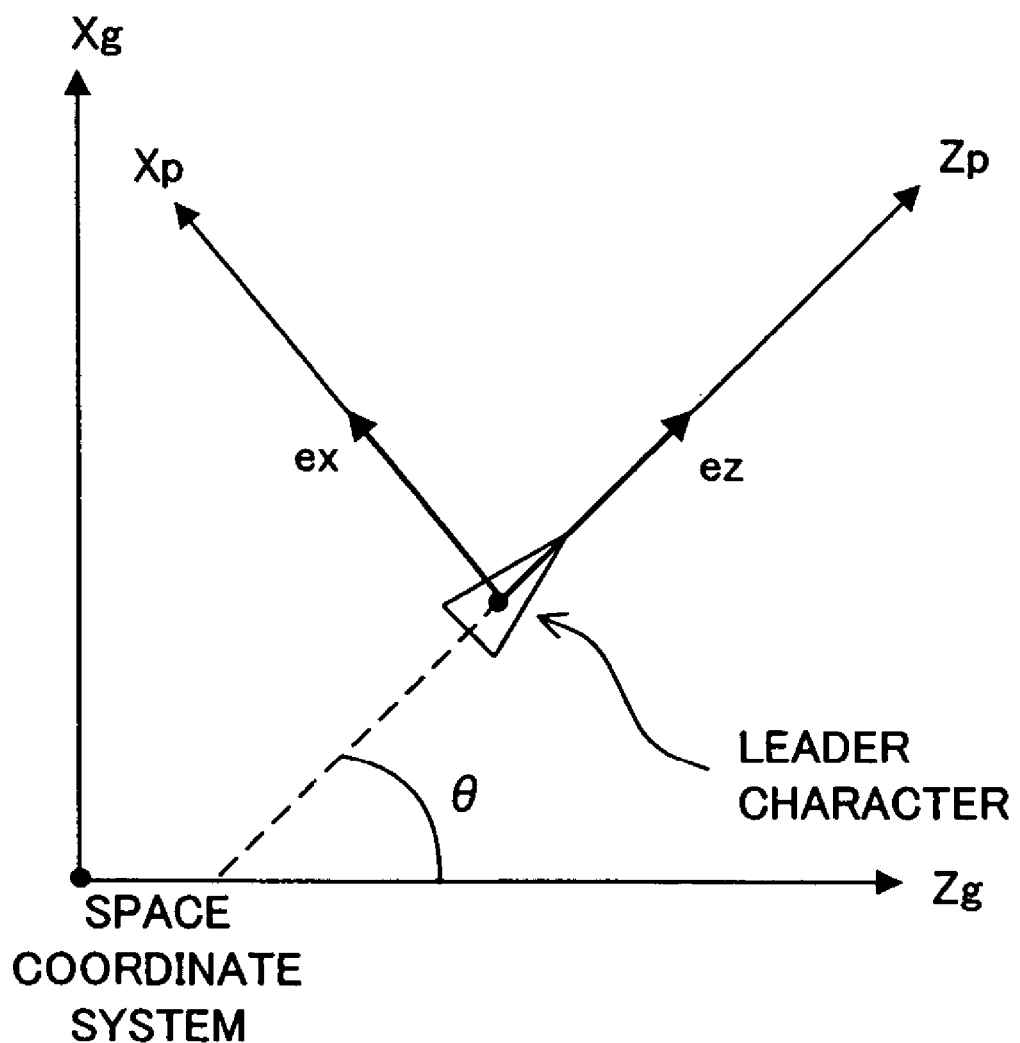
FIG. 9 is another graph showing a position vector of the leader character in the space coordinate system.

In this case,
ex=(cos θ,0,−sin θ);
ez=(sin θ,0,cos θ); and
ey=(0,1,0)

where θ is an angle formed by ez and the Zg axis as shown in FIG. 9. By substituting these values into the above equation (1), Sxg1 and SZg1 of the coordinates of the slot 1: Sg1=(SXg1, SYg1, SZg1), for example, can be obtained as follows:

$$SXg1 = SXp1 \cos θ + SZp1 \sin θ + LXg, \text{ and}$$

$$SZg1 = -SXp1 \sin θ + SZp1 \cos θ + LYg.$$

As described above, SYg1 is determined based on the topographic features.

As is the case with the slot 1, the coordinates of the slots 2 to 35 are calculated in a similar manner.

Next, a relationship between each slot and each sub character will be described.

Figures 10, 11:
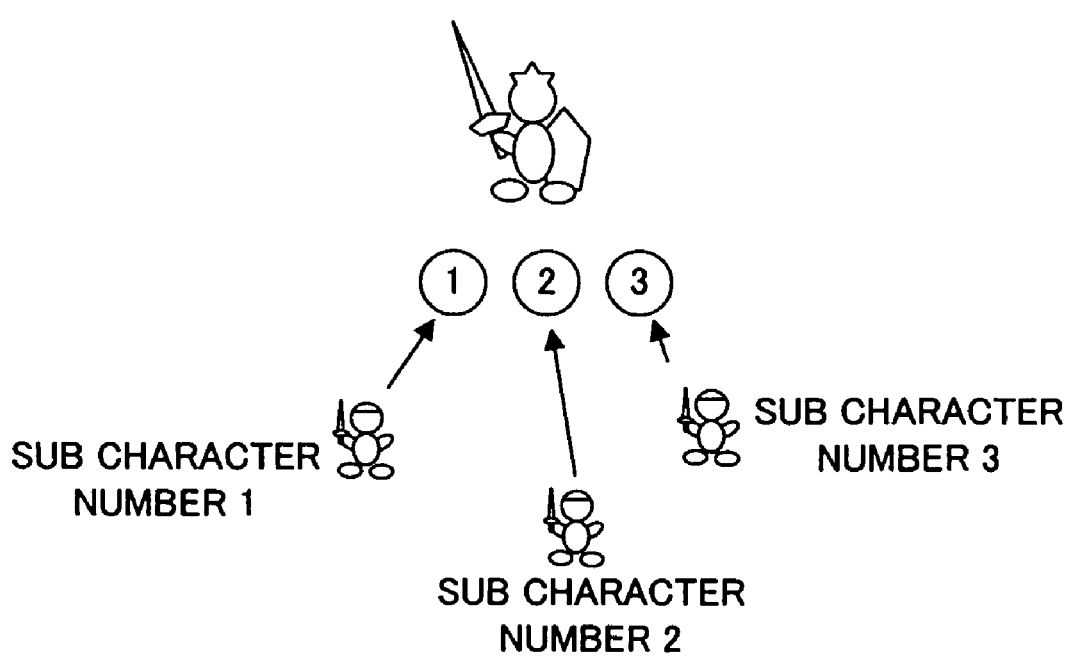
FIG. 10 is a table showing an exemplary correspondence between sub character numbers and slot numbers.
FIG. 11 is an illustration showing sub characters moving toward their corresponding slots.

As shown in FIG. 10, a slot number indicating a destination point is correlated with one sub character on an individual basis. In the example as shown in FIG. 10, a slot number 1 is correlated with a sub character number 1; a slot number 2 is correlated with a sub character number 2; a slot number 3 is correlated with a sub character number 3. As a result, as shown in FIG. 11, a sub character whose sub character number is 1 (herein after referred to as a sub character 1) moves toward the slot 1, a sub character 2 moves toward the slot 2, and a sub character 3 moves toward the slot 3.

In the example as shown in FIG. 10, a character number=a slot number. Note that this is illustrative only, and any slot number may be arbitrarily correlated with any sub character. For instance, a slot number may be assigned to a sub character in the order in which a sub character joins the group of the leader character. Alternatively, a slot number may be assigned to a sub character according to a characteristic of the sub character (e.g., a body color) such that sub characters having the same body color are situated next to each other. Note that a correspondence between sub characters and slot numbers may not be fixedly set. In certain exemplary illustrative embodiments, it is possible to appropriately change a correspondence between sub characters and slots by a rearranging process, which will be described below.

Figure 12:
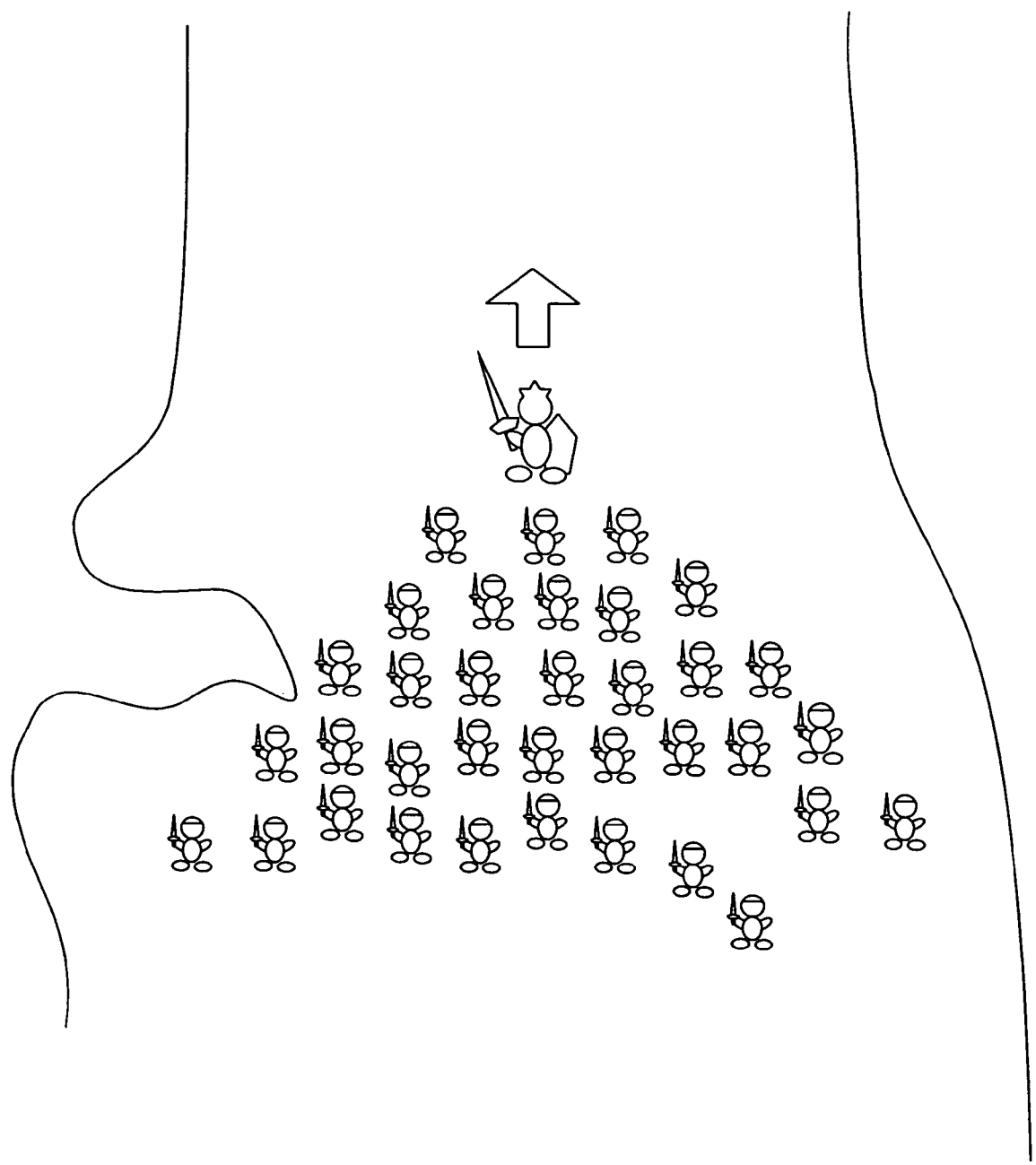
FIG. 12 is an illustration showing the leader character and sub characters moving in formation in a game space.

As described above, each sub character moves toward a corresponding slot. As a result, as shown in FIG. 12, the sub characters move in the game space while following the leader character in a predetermined formation.

Figure 13:
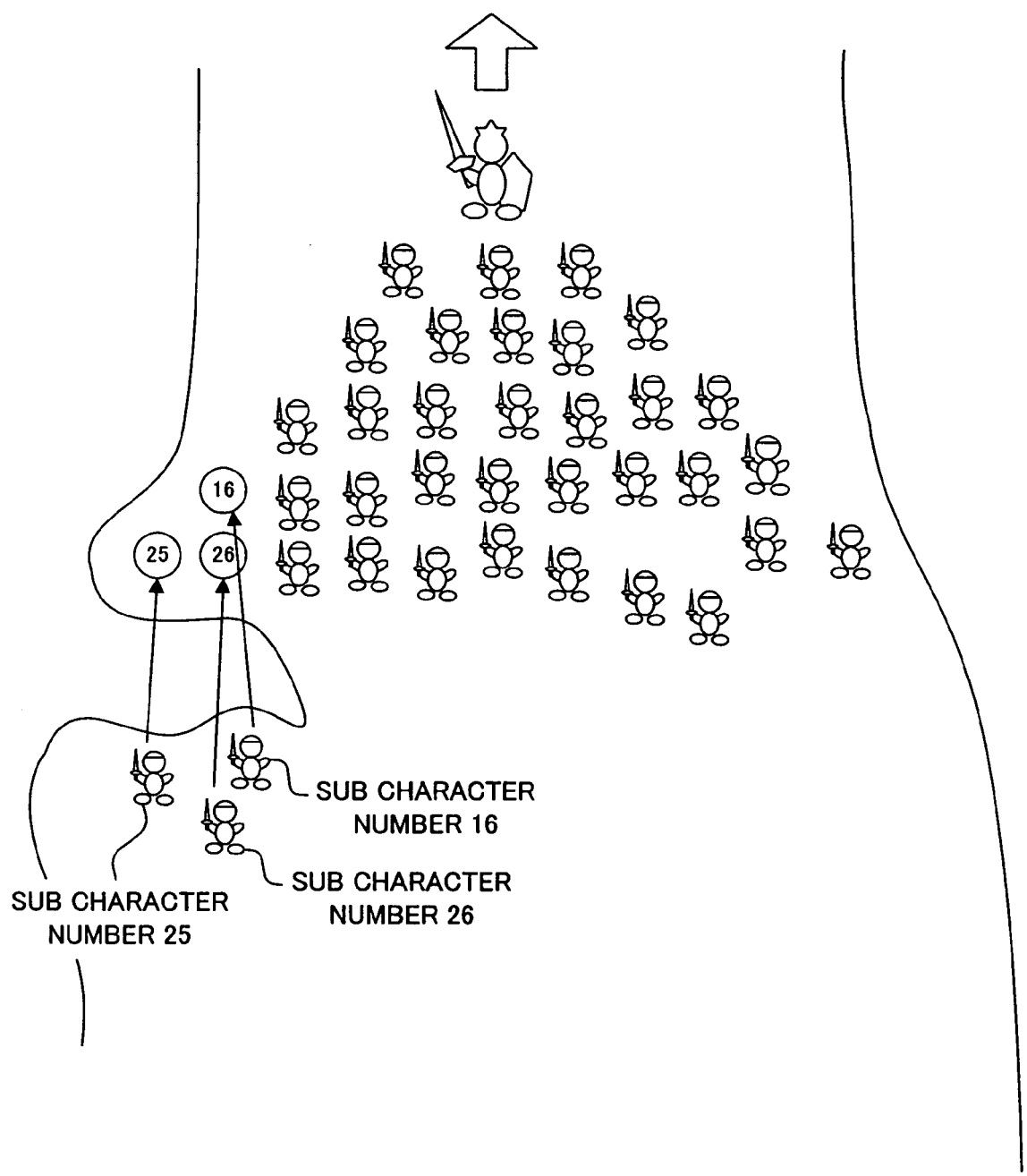
FIG. 13 is an illustration showing a scene in which topographic features prevent some sub characters from moving forward.

When each sub character moves in the game space in accordance with the control as described above, an obstacle such as a wall may block the sub character's path as shown in FIG. 13. In the example as shown in FIG. 13, the sub characters 16, 25, and 26 try to move toward the slots 16, 25, and 26, respectively. However, due to an obstacle (topographic features) lying between the sub characters and the slots, the sub characters 16, 25, and 26 cannot follow the leader character in this situation. Thus, certain exemplary illustrative embodiments may devise a solution to avoid such a troublesome situation. In brief, when a sub character collides with an obstacle, the sub character is controlled so as to follow the footsteps of the leader character instead of moving toward the corresponding slot. As long as the sub character follows the footsteps of the leader character, the sub character can proceed without being blocked by the obstacle. Hereinafter, a method for detouring around the obstacle will be specifically described.

Figure 14:
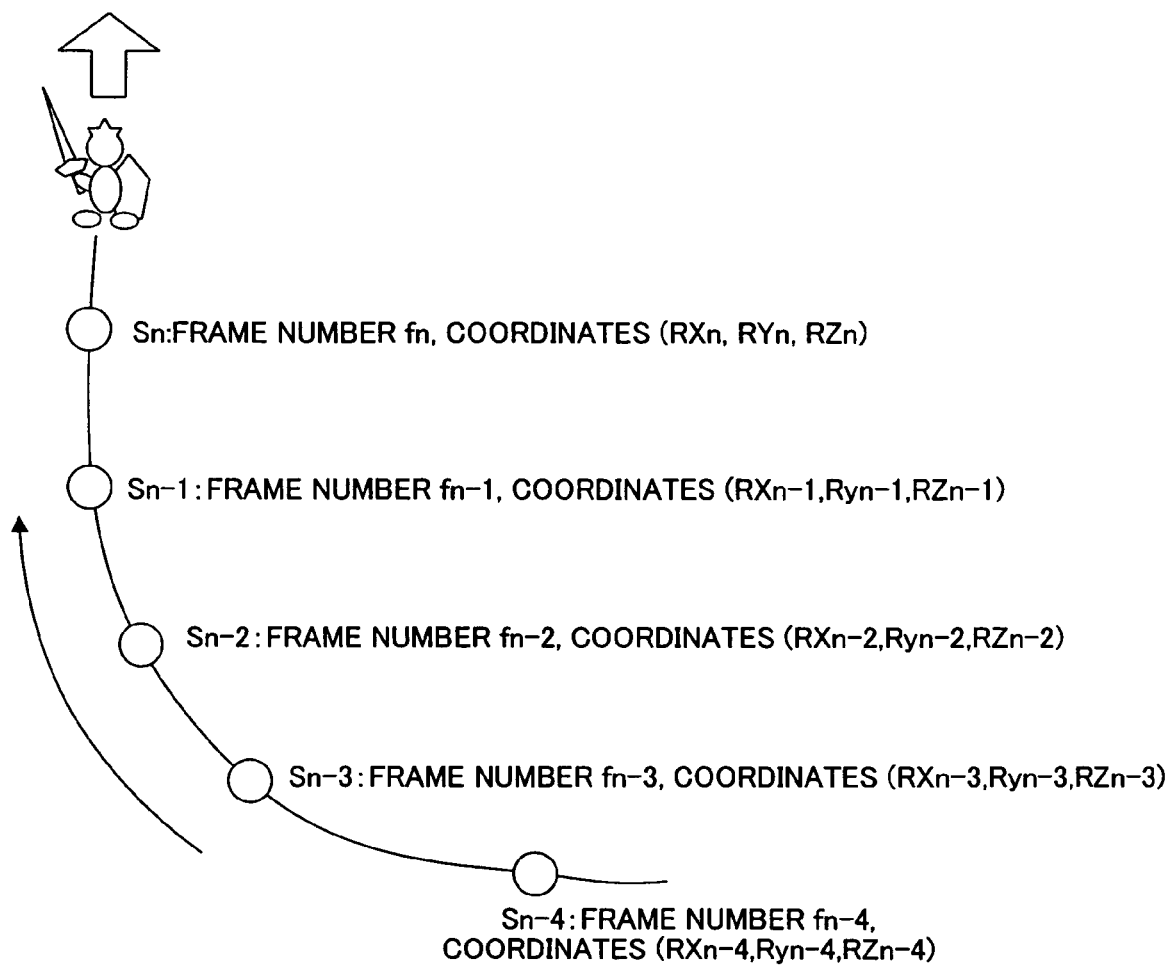
FIG. 14 is an illustration showing how footstep data is stored sequentially.

As shown in FIG. 14, in certain exemplary illustrative embodiments, a current location (coordinates in the space coordinate system) of the leader character is sequentially stored as a "footstep" of the leader character at predetermined intervals. To be more specific, a footstep is stored once in a predetermined frame period (e.g., once in ten frames). Data stored at the same time (herein after referred to as "footstep data") contains a current frame number and current coordinates of the leader character.

In certain exemplary illustrative embodiments, a new footstep is not stored in the case where the leader character is not at a predetermined distance from the newest footstep when ten frames has elapsed after the newest footstep has been stored, so as to prevent unnecessary footstep data from being stored. As a result, it is possible to make effective use of the storage area. Note that footstep data stored for a fixed time period has to be deleted from the storage area since it is impossible to store all footstep data indefinitely. For example, in the case where the number of stored footstep data is equal to or greater than a certain number, the oldest footstep data (e.g., footstep data having the smallest frame number) of the stored footstep data may be deleted from the storage area when a new footstep data is stored. Hereinafter, the newest footstep of the stored footsteps is referred to as a "footstep Sn", and the k-th footstep newest after Sn is referred to as a "footstep Sn-k".

Figure 15:
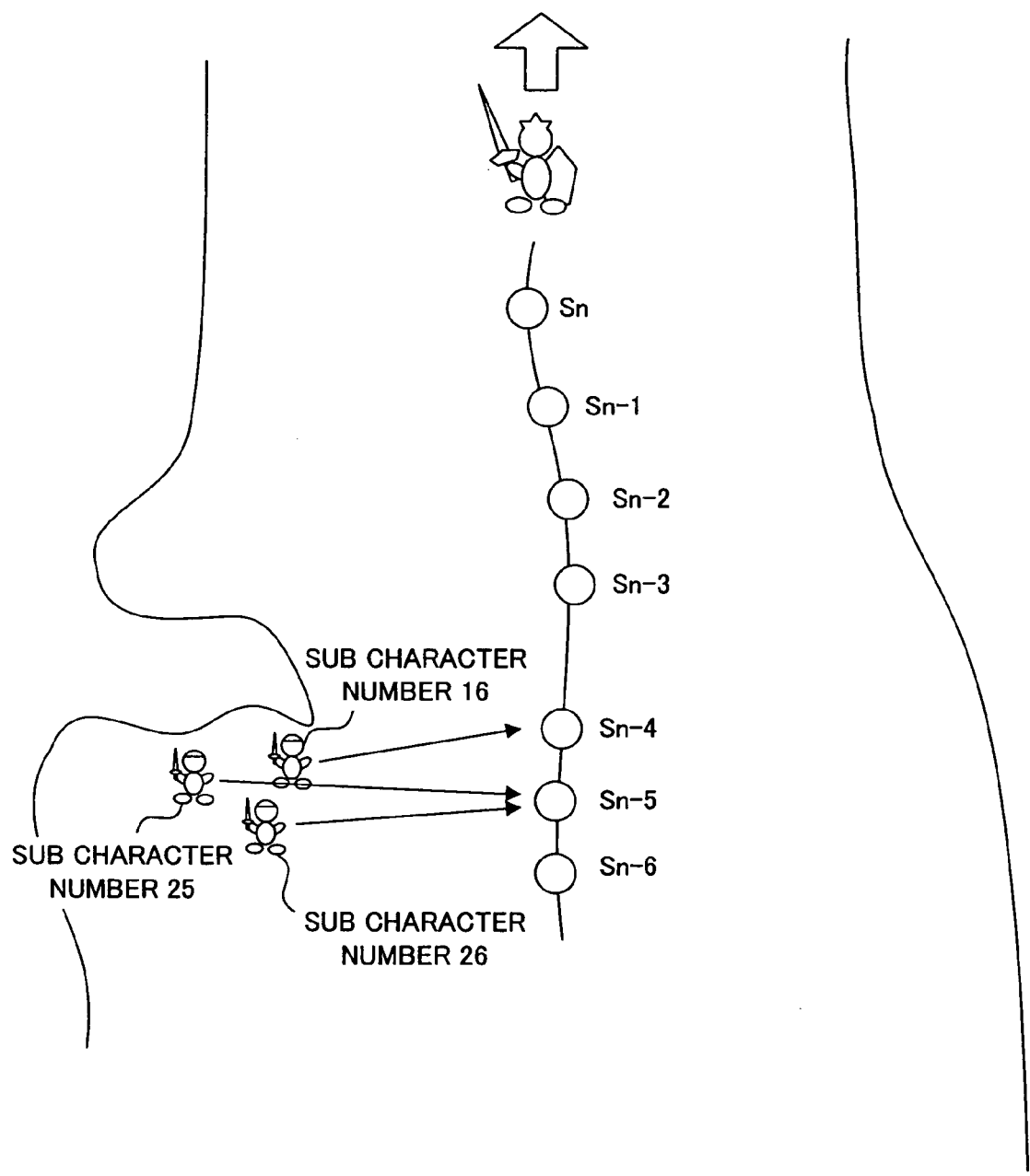
FIG. 15 is an illustration showing how sub characters change their destinations to corresponding footsteps of the leader character to move forward.

As shown in FIG. 13, in the case where the obstacle blocks the sub character's path, the destination of the stranded sub character is changed to a footstep closest to the current location of the sub character. Specifically, as shown in FIG. 15, when the sub character 16 collides with a wall, the sub character 16 changes its destination to a footstep closest to the current location thereof (e.g., a footstep Sn-4). Similarly, the sub character 25 changes its destination to a footstep Sn-5, and the sub character 26 changes its destination to a footstep Sn-5.

Figure 16:
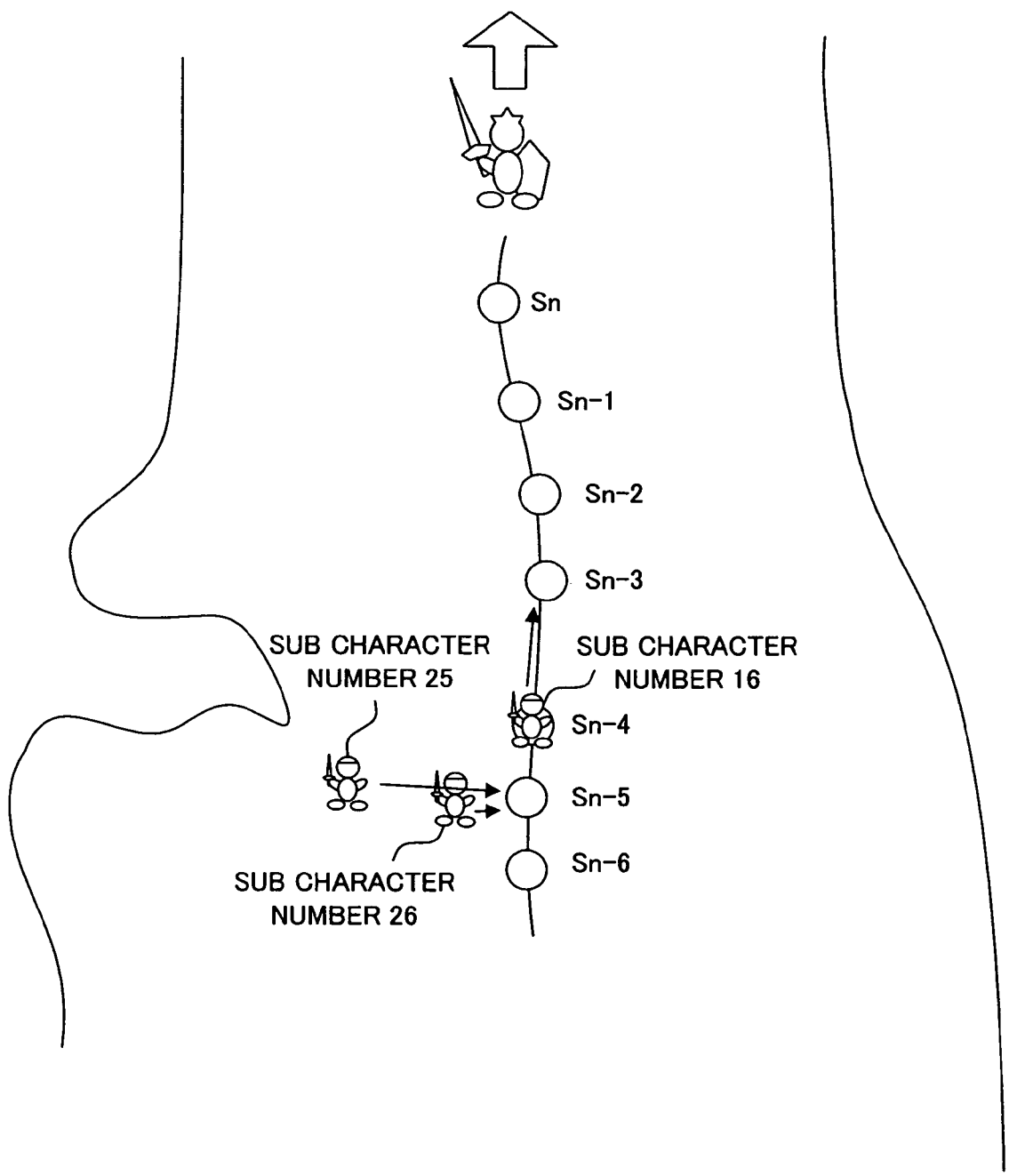
FIG. 16 is an illustration showing how sub characters move forward by following the track of the leader character.

When the sub character arrives at the destination footstep, the sub character changes its destination to a footstep newer than the footstep at which the sub character has arrived (e.g., a footstep having a newer frame number). For example, as shown in FIG. 16, when the sub character 16 arrives at the footstep Sn-4, the destination of the sub character 16 is changed to a footstep Sn-3. When the sub character 16 arrives at the footstep Sn-3, the destination of the sub character 16 is changed to a footstep Sn-2. By repeating the above process, the sub character 16 can follow the track of the leader character. The sub characters 25 and 26 follow the footsteps of the leader character in a similar manner.

Figure 17:
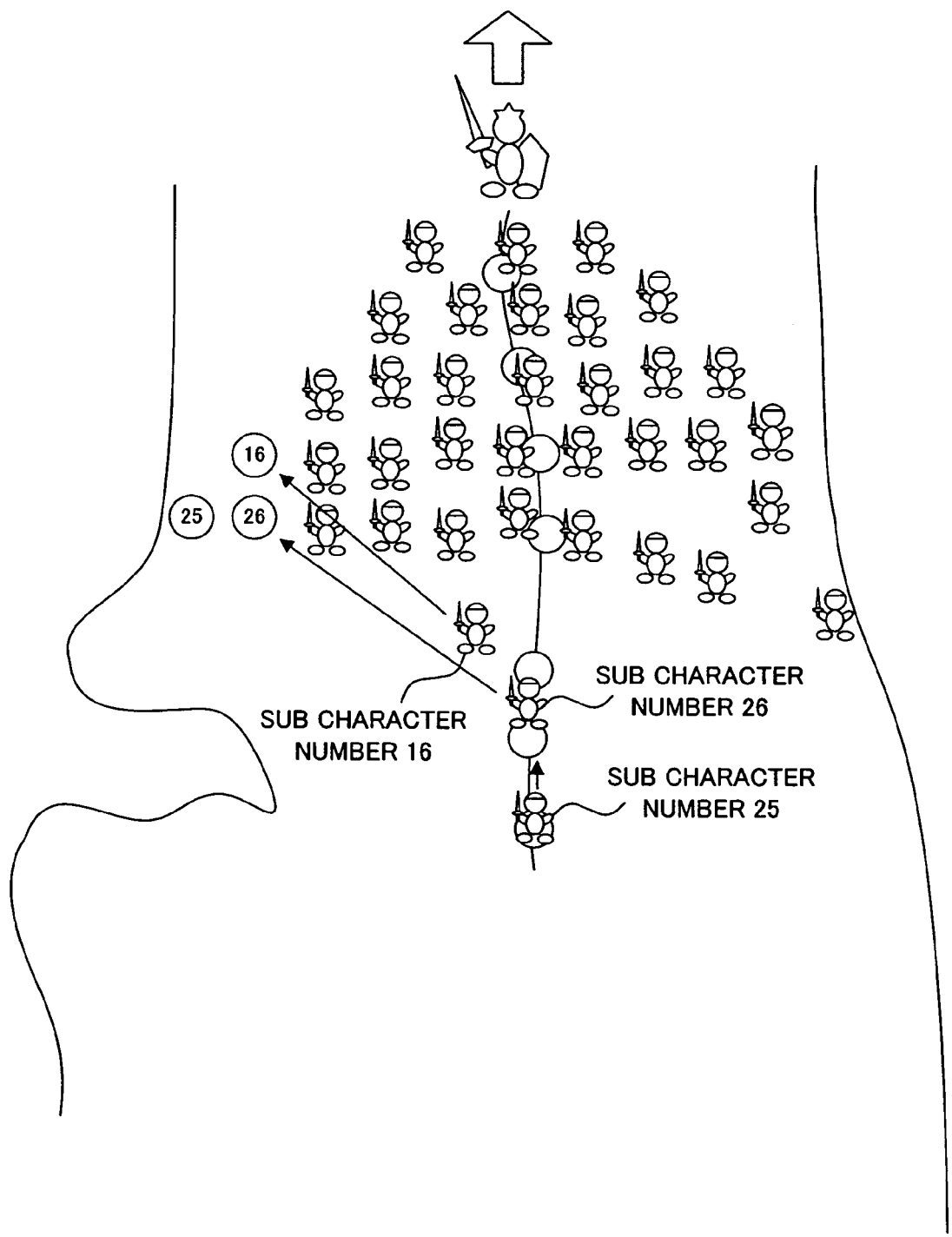
FIG. 17 is an illustration showing how sub characters return to their corresponding slots.

While the sub character follows the track (e.g., footsteps) of the leader character, a distance between the current coordinates of the sub character and the coordinates of the slot corresponding to the sub character is measured. If it is determined that the sub character is within a fixed distance from the corresponding slot, the destination of the sub character is changed from a footstep to the slot. As a result, as shown in FIG. 17, each sub character can return to its original course, and follow the leader character by moving toward the corresponding slot.

Figure 18:
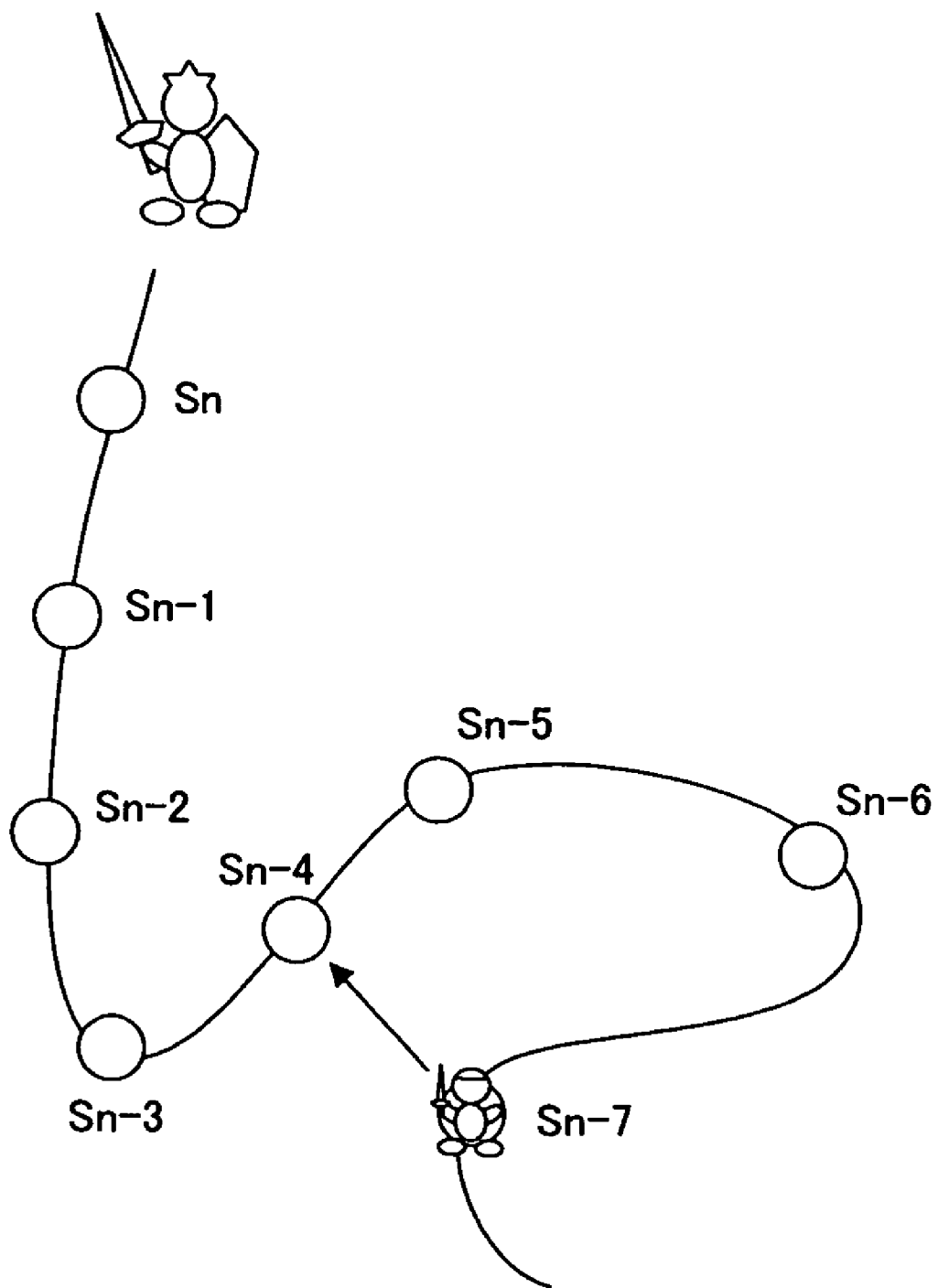
FIG. 18 is an illustration showing how a sub character takes a shortcut.

Normally, the sub character follows the footsteps of the leader character in accordance with the order in which the footsteps a restored. However, in certain exemplary illustrative embodiments, any footstep closest to the footstep at which the sub character has arrived is selected as a next destination from newer footsteps, so that the sub character can arrive at the corresponding slot as soon as possible. For example, as shown in FIG. 18, in the case where the sub character arrives at a footstep Sn-7, a next destination is selected from footsteps Sn to Sn-6 (e.g., footsteps newer than the footstep Sn-7). In other words, instead of immediately setting a footstep Sn-6 as a next destination, a footstep closest to the footstep Sn-7 is selected as a next destination from the footsteps Sn to Sn-6. By taking such a shortcut, the sub character can return to its original destination slot sooner than the case where the sub character follows the footsteps in accordance with the order in which the footsteps are stored.

Note that an obstacle may block the sub character's path while the sub character takes a shortcut in a manner as described above. In FIG. 18, for example, there may be a wall between the footstep Sn-7 and the footstep Sn-4. In this case, the sub character continues to track the footsteps of the leader character by changing its destination to a different footstep. Alternatively, the sub character may get back to the footstep Sn-7 (the newest footstep at which the sub character has arrived), so as to follow the footsteps of the leader character again in accordance with the order in which the footsteps are stored. In certain exemplary illustrative embodiments, a frame number of the newest footstep at which a sub character has arrived (in the example as shown in FIG. 18, a frame number fn-7 of the footstep Sn-7) is stored on a character-by-character basis. In the case where the sub character's path is blocked by the obstacle on the shortcut, a footstep closest to the current location of the sub character, other than the current destination (in the example as shown in FIG. 18, Sn-4), is selected from the footsteps newer than the footstep at which the sub character has arrived (in the example as shown in FIG. 18, footsteps Sn~Sn-6) as a next destination (in the example as shown in FIG. 18, Sn-3). Thus, the sub character can continue to track the footsteps of the leader character even if the sub character's path is blocked by the obstacle on the shortcut.

Next, a game process executed by the CPU 22 based on the game program will be described in more detail.

Figure 19:
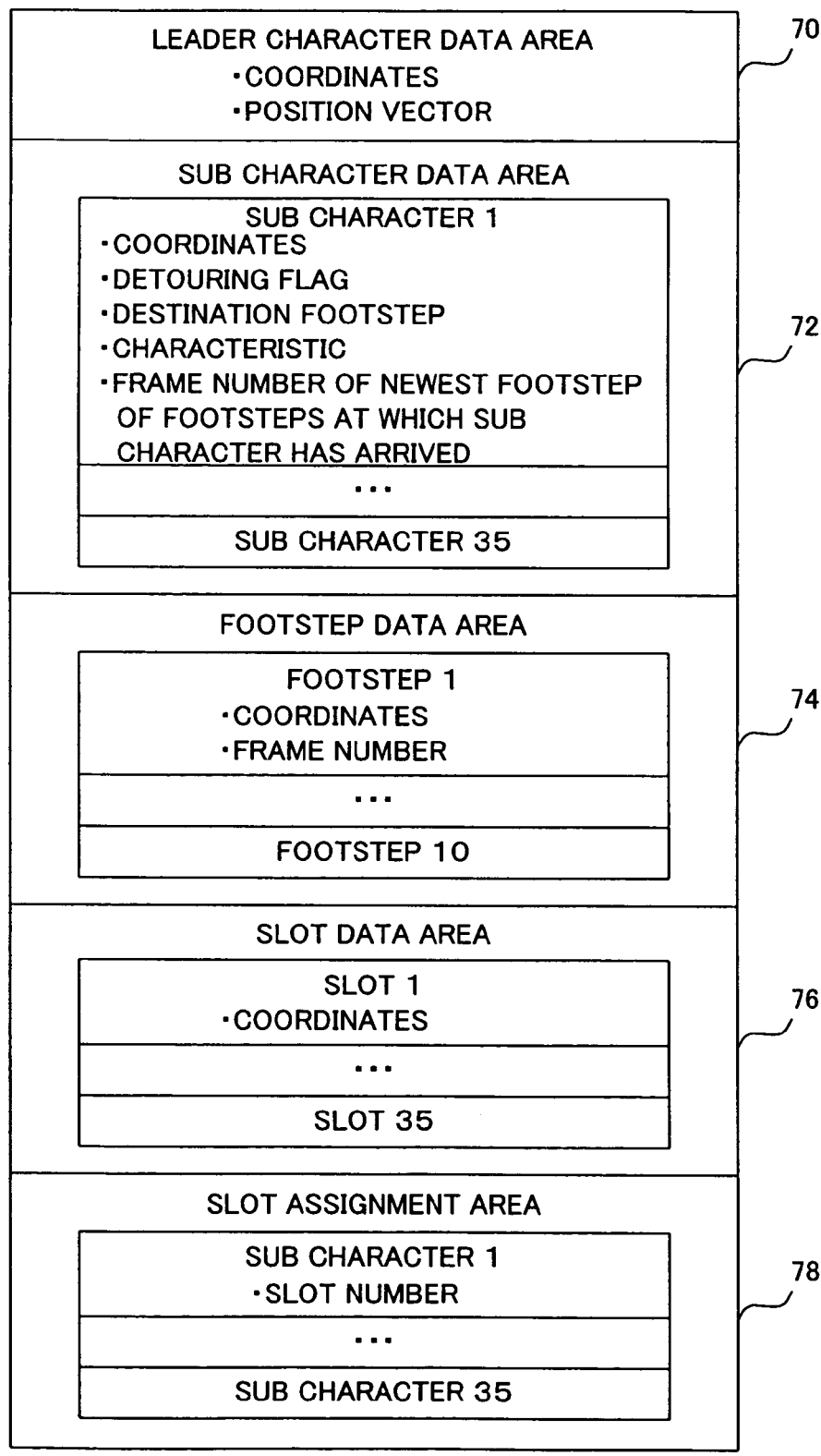
FIG. 19 is a memory map of a main memory 34.

FIG. 19 is a memory map of the main memory 34. A leader character data area 70 stores coordinates of the current location of the leader character (given in the space coordinate system) and a position vector of the leader character (given in the space coordinate system). A sub character data area 72 stores, on a sub character-by-sub character basis, coordinates of the current location of a sub character (given in the space coordinate system), a detouring flag, a destination footstep (data for specifying one piece of footstep data stored in a footstep data area), a characteristic, and a frame number of the newest footstep of the footsteps at which the sub character has arrived. A footstep data area 74 stores a plurality of footstep data (in FIG. 19, ten pieces of footstep data). Each footstep data includes coordinates (given in the space coordinate system) and a frame number. A slot data area 76 stores, on a slot-by-slot basis, slot coordinates (given in the space coordinate system). The above slot coordinates are determined based on the relative coordinates as shown in FIG. 6. A slot assignment area 78 stores, on a sub character-by-sub character basis, a correspondence between sub characters and slot numbers as shown in FIG. 10.

FIGS. 20 to 24 are flowcharts showing a flow of a game process executed by the CPU 22 based on the game program.

Figure 20:
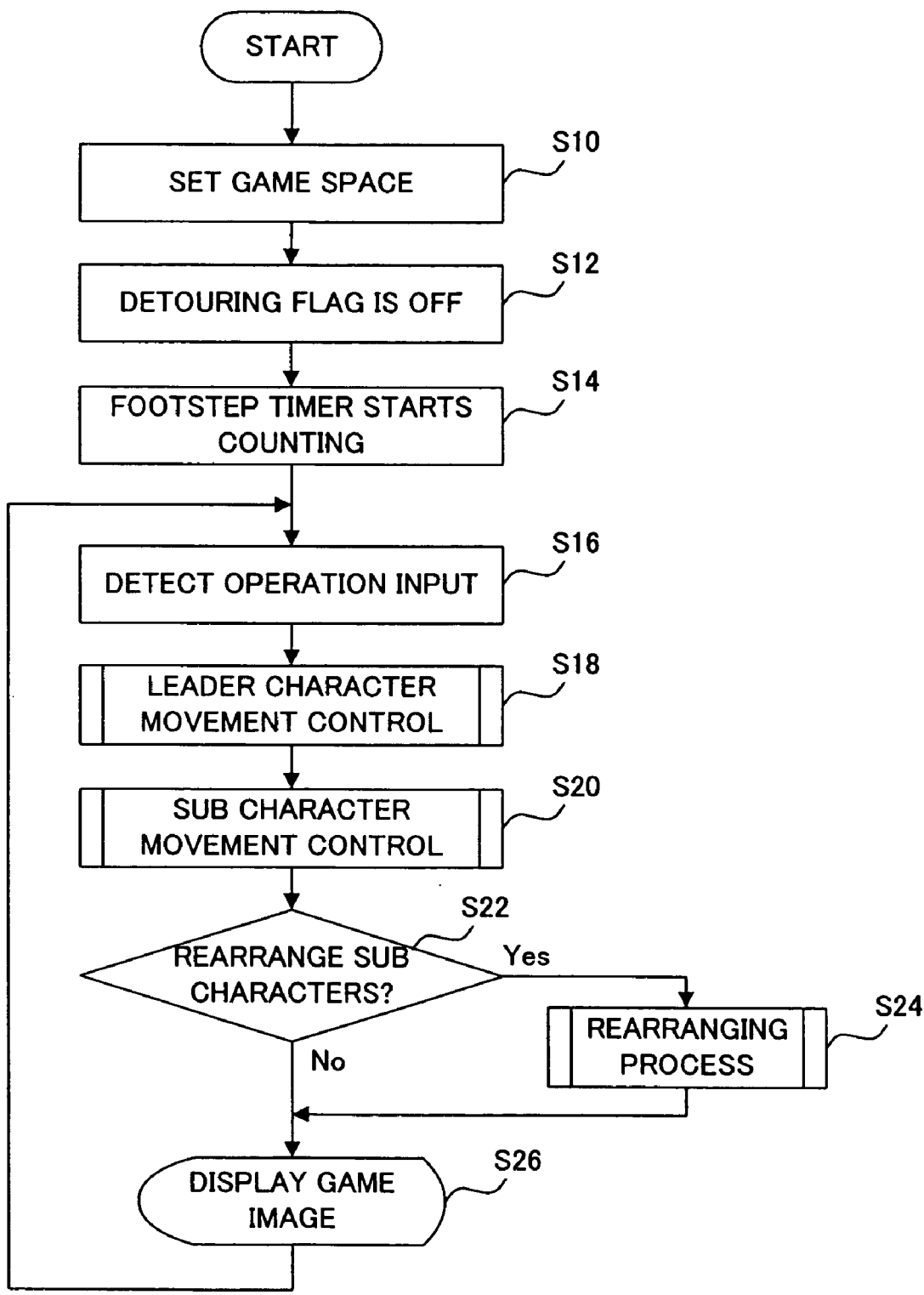
FIG. 20 is a flowchart showing a flow of a game process.

In FIG. 20, the CPU 22 first sets a game space (S10). To be more specific, the leader character and the sub characters are disposed in their respective initial positions. The detouring flags of all the sub characters are turned off (S12), and a footstep timer starts counting (S14). The detouring flag, which is turned on when a sub character is prevented from moving toward its corresponding slot by an obstacle such as a wall, indicates whether or not the sub character is following the footsteps of the leader character so as to detour around the obstacle. The footstep timer is a timer for storing footstep data once every ten frames.

Next, the CPU 22 detects an operation input inputted from the controller 20 (S16). Then, the CPU 22 performs a movement control process for the leader character (S18). Hereinafter, referring to FIG. 21, details of the leader character movement control process will be described.

Figure 21:
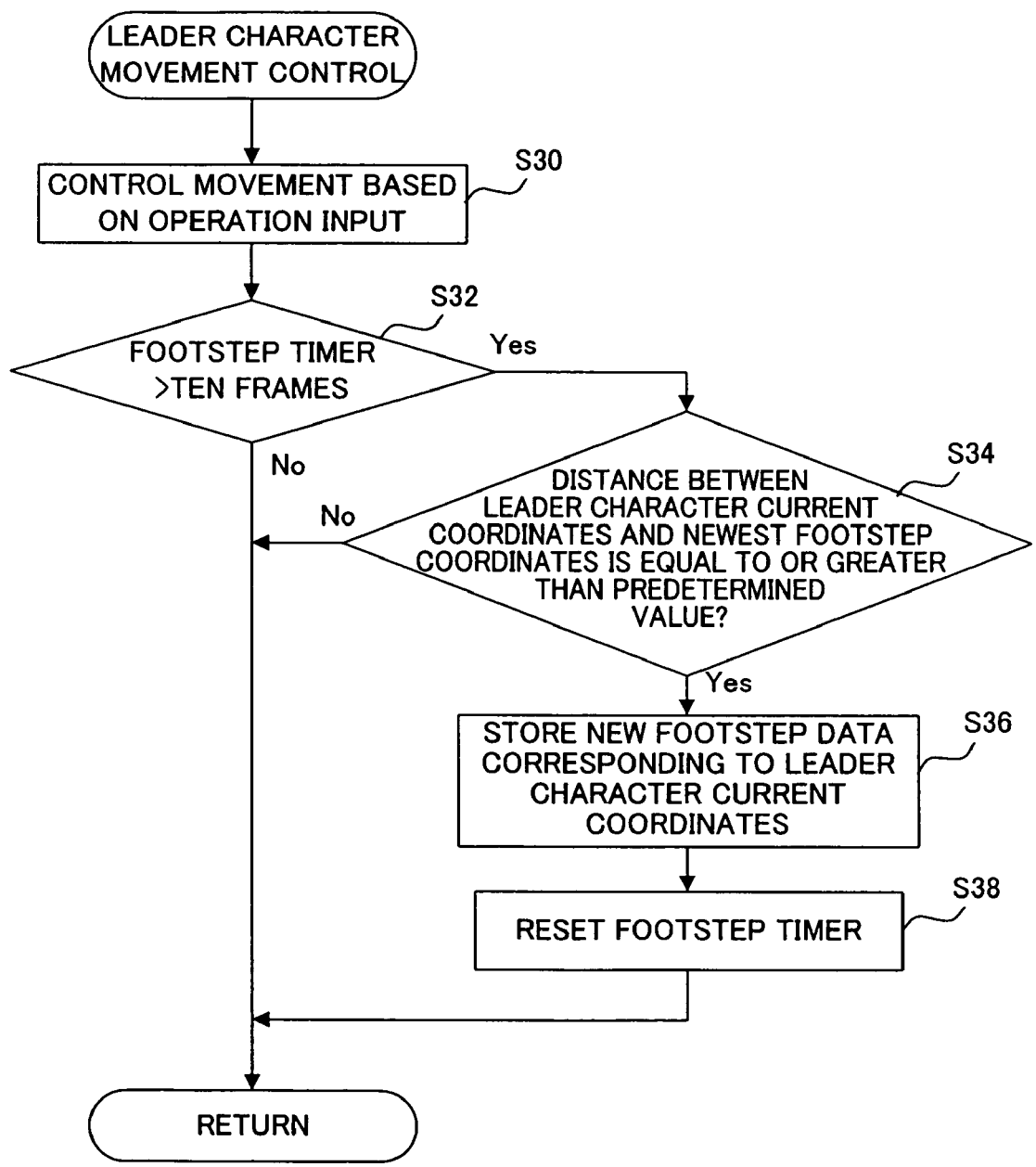
FIG. 21 is a flowchart showing a flow of a leader character movement control process.

In FIG. 21, the CPU 22 performs movement control for the leader character based on the operation input (S30). Specifically, the CPU 22 updates the coordinates and the position vector of the leader character based on the operation input. Then, the CPU 22 determines whether or not a count value of the footstep timer exceeds a predetermined frame period (e.g., ten frames) (S32)

In the case where the count value exceeds ten frames, the CPU 22 determines whether or not a distance between the current coordinates of the leader character and the coordinates of the newest footstep is equal to or greater than a predetermined value (S34). Note that the coordinates of the newest footstep is retrieved from footstep data having the greatest frame number included in the plurality of footstep data stored in the footstep data area 74 of the main memory 34.

In the case where the count value does not exceed ten frames at step S32, or a distance between the current coordinates of the leader character and the coordinates of the newest footstep is not equal to or greater than a predetermined value at step S34, the CPU 22 ends the leader character movement control process without storing footstep data. On the other hand, in the case where a distance between the current coordinates of the leader character and the coordinates of the newest footstep is equal to or greater than a predetermined value at step S34, the CPU 22 stores the current coordinates of the leader character and the current frame number in the footstep data area 74 as new footstep data (S36). If ten pieces of footstep data have already been stored in the footstep data area 74, the CPU 22 overwrites new footstep data in the area where the footstep data having the smallest frame number is stored. Then, the CPU 22 resets the footstep timer (e.g., starts re-counting) (S38), and ends the leader character movement control process.

In FIG. 20, when the leader character movement control process is ended, the CPU 22 performs a sub character movement control process (S20). Hereinafter, referring to FIG. 22, details of the sub character movement control process will be described.

Figure 22:
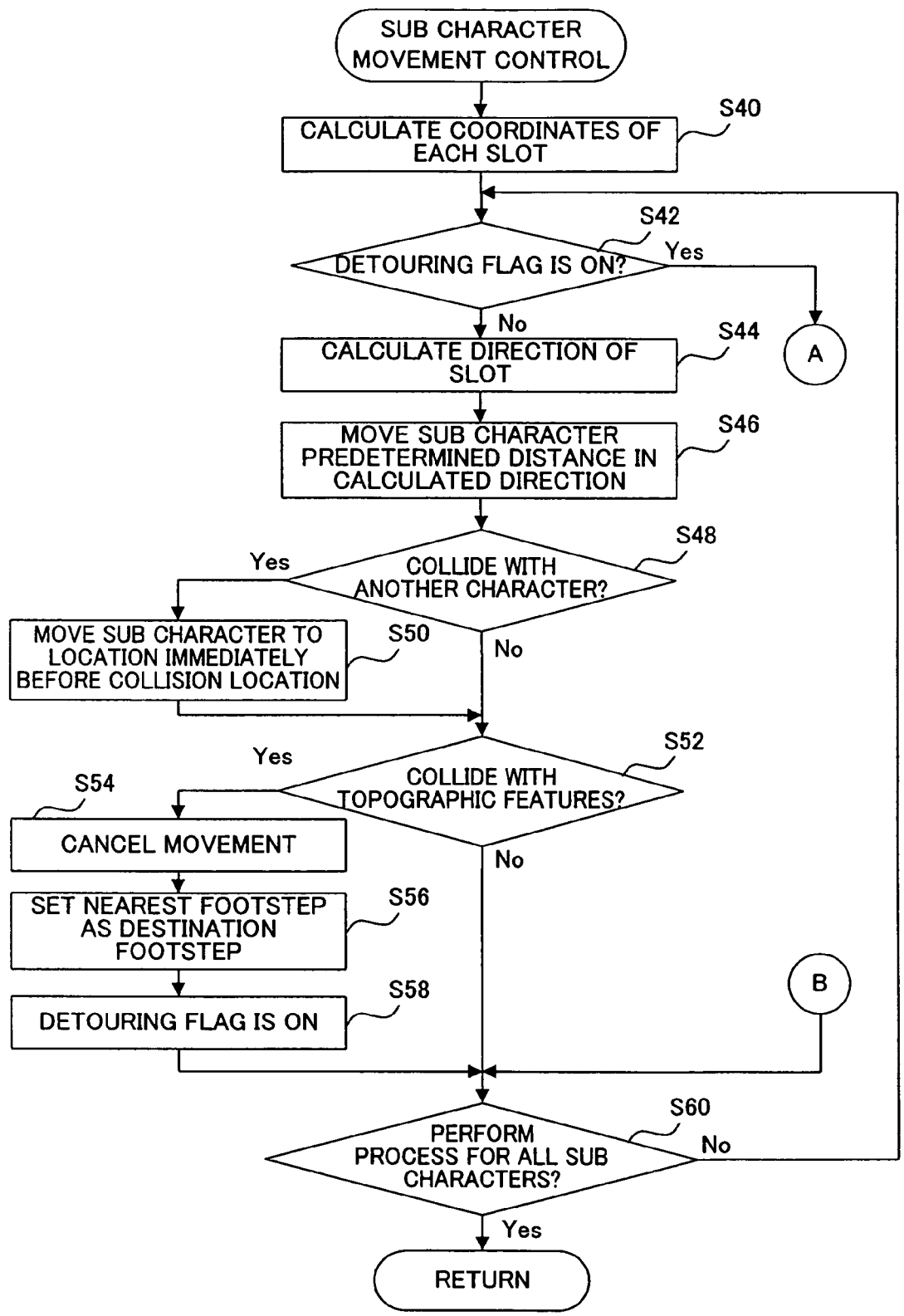
FIG. 22 is a flowchart showing a portion of a flow of a sub character movement control process.

In FIG. 22, the CPU 22 first calculates coordinates of each slot (given in the space coordinate system) in a manner as described by referring to FIGS. 7 to 9, and stores the calculated coordinates in the slot data area 76 of the main memory 34. In other words, the CPU 22 calculates coordinates of each slot (given in the space coordinate system) based on the relative coordinates of each slot as shown in FIG. 6, which are stored in the DVD-ROM 16, and the current coordinates and position vector of the leader character.

A process at steps S42 to S58 of FIG. 22 and steps S62 to S80 of FIG. 23, which will be described below, is sequentially repeated for each sub character as many times as there are sub characters. Hereinafter, the case in which the sub character 1 is processed will be described as a typical example.

The CPU 22 first determines whether or not the detouring flag of the sub character 1 is turned on (S42). In the case where it is turned on, the CPU 22 proceeds to step S62 of FIG. 23. On the other hand, in the case where it is turned off, the CPU 22 proceeds to step S44 of FIG. 22. A process performed in the case where the detouring flag is turned on will be described further below. Firstly, an operation performed in the case where the detouring flag is turned off will be described.

In the case where the detouring flag of the sub character 1 is turned off at step S42, the CPU 22 first calculates a direction of the destination slot (a slot correlated with the sub character 1 in the slot assignment area 78) seen from the current location of the sub character 1 (S44). The coordinates of the sub character 1 and the coordinates of the destination slot are used for this calculation. Next, the CPU 22 moves the sub character 1 a predetermined distance in the calculated direction (S46). More specifically, the CPU 22 shifts the current coordinates of the sub character 1 in the direction calculated at step S44 by an amount corresponding to the traveling speed of the sub character 1. Next, the CPU 22 determines whether or not the sub character 1 will collide with another character during the movement (S48). In the case where it is determined that the sub character will collide with another character during the movement, the CPU 22 sets the coordinates of the sub character 1 so as to move the sub character 1 toward a location immediately before a collision location (S50).

Next, the CPU 22 determines whether or not the sub character 1 having moved at step S46 will collide with topographic features (S52). In the case where it is determined that the sub character 1 will not collide with the topographic features, the CPU 22 proceeds to step S60.

On the other hand, in the case where it is determined that the sub character 1 will collide with the topographic features, the CPU 22 cancels the movement of the sub character 1 at step S46 (S54), sets a footstep closest to the current location of the sub character 1 as a destination footstep (S56), and turns on the detouring flag of the sub character 1 (S58). As a result, the sub character 1 stops taking the direct route to the destination slot, and follows the footsteps of the leader character from a next frame. After turning on the detouring flag of the sub character 1, the CPU 22 proceeds to step S60.

In certain exemplary illustrative embodiments, it is assumed that the detouring flag of the sub character 1 is turned on when it is determined at step S52 that the sub character 1 will collide with the topographic features. Alternatively, the detouring flag of the sub character 1 may be turned on only when the path of the sub character 1 is blocked by the topographic features for more than a predetermined time period after collision. In this case, a counter for counting a time period during which a sub character collides with the topographic features may be prepared for each sub character so as to compare the counter value with a predetermined value for comparison purposes.

In certain exemplary illustrative embodiments, it is assumed that the detouring flag of the sub character 1 is turned on only when it is determined that the sub character 1 having moved a predetermined distance at step S64 will collide with the topographic features. Alternatively, the presence of an obstacle between the current location of the sub character 1 and the destination slot may be detected on a regular basis so as to turn on the detouring flag when the presence of an obstacle is detected (e.g., before coming close to the obstacle).

Figure 23:
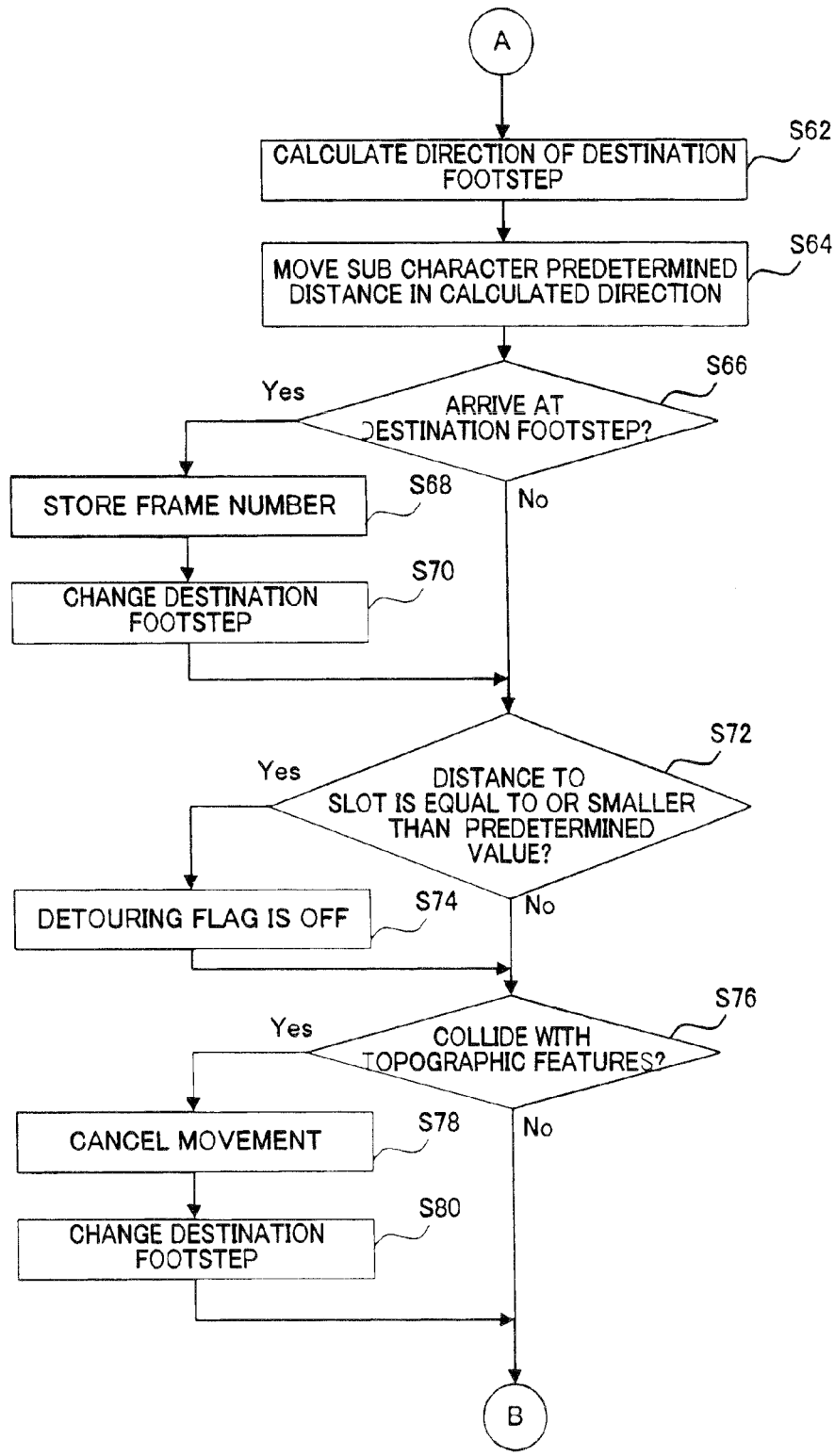
FIG. 23 is a flowchart showing a portion of a flow of the sub character movement control process.

On the other hand, in the case where the detouring flag of the sub character 1 is turned on at step S62, the CPU 22 first calculates a direction of the destination footstep seen from the current location of the sub character 1 at step S62 of FIG. 23. The coordinates of the sub character 1 and the coordinates of the destination footstep are used for this calculation. Next, the CPU 22 moves the sub character 1 a predetermined distance in the calculated direction (S64). More specifically, the CPU 22 shifts the current coordinates of the sub character 1 in the direction calculated at step S62 by an amount corresponding to the traveling speed of the sub character 1.

Next, the CPU 22 determines whether or not the sub character 1 arrives at the destination footstep as a result of the movement at step S64 (S66). In the case where it is determined that the sub character 1 arrives at the destination footstep, the CPU 22 reads a frame number of footstep data corresponding to the destination footstep from the footstep data area 74 of the main memory 34, and stores the read frame number as "a frame number of the newest footstep of the footsteps at which the sub character has arrived" in the sub character data area 72 (S68). Then, the CPU 22 changes the destination footstep (S70). More specifically, the CPU 22 extracts, from a plurality of footsteps stored in the footstep data area 74, a footstep whose frame number is greater than the frame number stored in the sub character data area 72 (e.g., a footstep newer than the footsteps at which the sub character 1 has arrived) and which is closest to the current location of the sub character 1, and sets the footstep thus extracted as a next destination footstep.

Next, the CPU 22 determines whether or not a distance between the current location of the sub character 1 and the destination slot is equal to or smaller than a predetermined value (S72). In the case where it is determined that a distance between the current location of the sub character 1 and the destination slot is equal to or smaller than a predetermined value, the CPU 22 turns off the detouring flag of the sub character 1 such that the sub character 1 heads for the destination slot in a next frame or later (S74).

Next, the CPU 22 determines whether or not the sub character 1 having moved at step S64 will collide with topographic features (S76). In the case where it is determined that the sub character 1 will not collide with the topographic features, the CPU 22 proceeds to step S60 of FIG. 22.

On the other hand, in the case where it is determined that the sub character 1 will collide with the topographic features, the CPU 22 cancels the movement of the sub character 1 at step S64 (S78), and changes the destination footstep (S80). More specifically, the CPU 22 extracts, from a plurality of footsteps stored in the footstep data area 74, a footstep whose frame number is greater than the frame number stored in the sub character data area 72 (e.g., a footstep newer than the footsteps at which the sub character 1 has arrived) and which is closest to the current location of the sub character 1, and sets the footstep thus extracted as a next destination footstep. Then, the CPU 22 proceeds to step S60 of FIG. 22.

In certain exemplary illustrative embodiments, it is assumed that the destination footstep is changed when it is determined at step S76 that the sub character 1 will collide with the topographic features. Alternatively, the destination footstep may be changed only when the path of the sub character 1 is blocked by the topographic features for more than a predetermined time period after collision. In this case, a counter for counting a time period during which a sub character collides with the topographic features may be prepared for each sub character so as to compare the counter value with a predetermined value for comparison purposes.

In certain exemplary illustrative embodiments, it is assumed that the destination footstep of the sub character 1 is changed only when it is determined that the sub character 1 having moved a predetermined distance at step S64 will collide with the topographic features. Alternatively, the presence of an obstacle between the current location of the sub character 1 and the destination footstep may be detected at the time of setting of the destination footstep of the sub character 1, so as to change the destination footstep when the presence of the obstacle is detected.

At step S60 of FIG. 22, it is determined whether or not the process is performed for all the sub characters (S60). In the case where there are still sub characters to be processed, the CPU 22 goes back to step S42, and repeats the same process for each un processed sub character. When the process is finally performed for all the sub characters, the CPU 22 proceeds to step S22 of FIG. 20.

At step S22 of FIG. 22, the CPU 22 determines whether or not rearrangement of the sub characters is required based on an operation input inputted from the controller 20, for example. In the case where rearrangement is required, the CPU 22 performs a rearrangement process at step S24. Hereinafter, referring to FIG. 24, details of the rearrangement process will be described.

Figure 24:
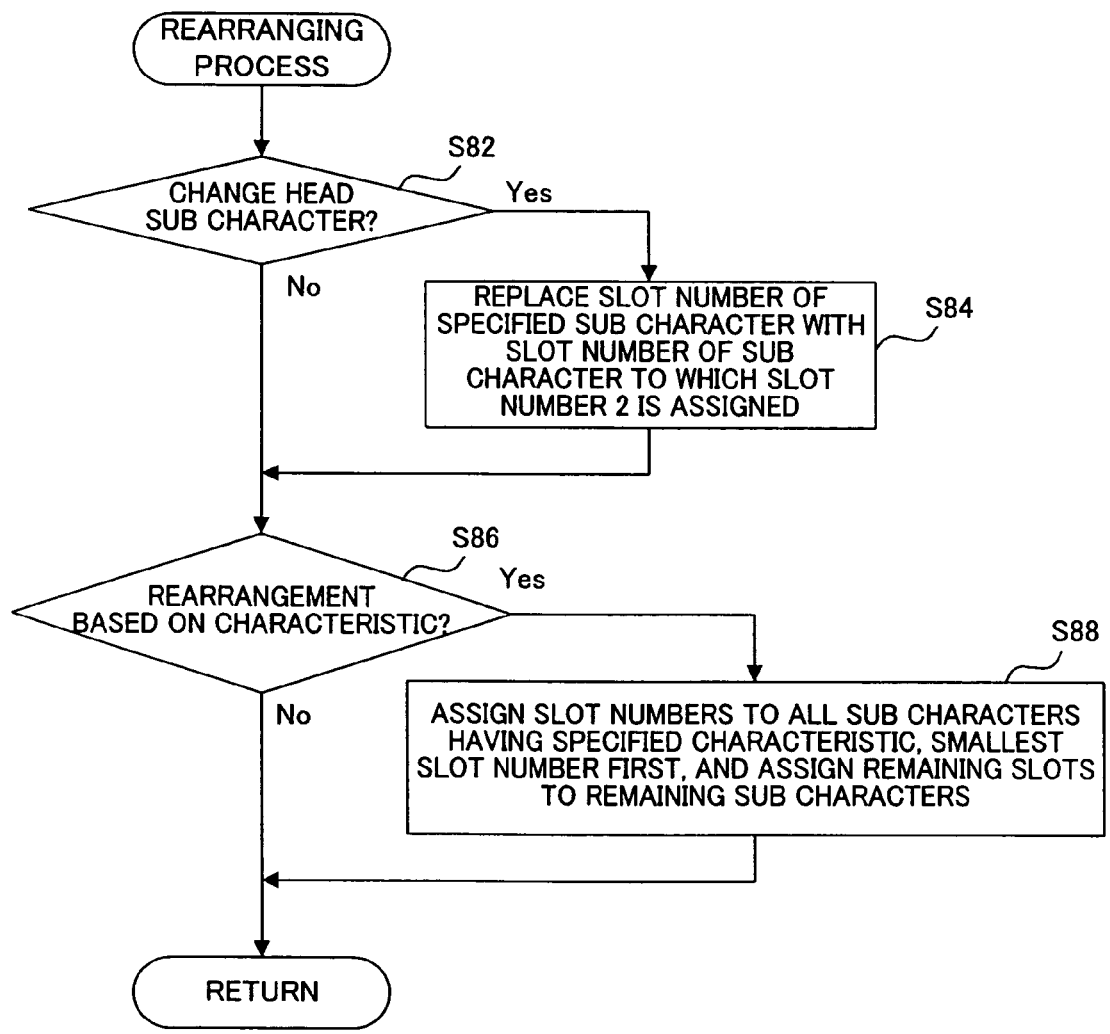
FIG. 24 is a flowchart showing a flow of a rearranging process.

In FIG. 24, the CPU 22 determines whether or not it is instructed to change a head sub character (e.g., a sub character corresponding to a slot number 2) to another specified sub character (S82). Specifically, the player operates a predetermined switch of the controller 20 to give such an instruction and specify a sub character the player desires to position at the head of the sub characters. In response to the instruction, the CPU 22 updates the sub character data area 72 and the slot assignment area 78 of the main memory 34 so as to replace a slot number of the sub character, to which 2 has been assigned as a slot number, with a slot number of the specified sub character (S84). Specifically, the CPU 22 sets a slot number of the sub character, to which 2 has been assigned as a slot number, to a slot number assigned to the specified sub character, and sets a slot number of the specified sub character to 2.

Next, the CPU 22 determines whether or not it is instructed to rearrange the sub characters according to their characteristics (S86). Specifically, the player operates a predetermined switch of the controller 20 to give such an instruction and specify a characteristic. In response to the instruction, the CPU 22 updates the sub character data area 72 and the slot assignment area 78 of the main memory 34 such that any sub character having the specified characteristic is disposed in the front portion of the formation (S88). More specifically, the CPU 22 assigns slot numbers to all the sub characters having the specified characteristic, the smallest slot number first, and assigns the remaining slots to the remaining sub characters.

Next, at step S26 in FIG. 20, the CPU 22 displays a game image, and goes back to step S16. The process from steps S16 to S26 is repeated until the game is ended.

In certain exemplary illustrative embodiments, it is assumed that the game space is a three-dimensional virtual space, but the present invention is not limited thereto. For example, the game space may be two-dimensional.

In certain exemplary illustrative embodiments, it is assumed that the game program is provided from the DVD-ROM 16 to the game main unit 14, but the present invention is not limited thereto. The game program may be provided from an arbitrary recording medium to the game main unit 14, or may be provided to the game main unit 14 through a fixed or wireless communication line. Alternatively, a function of the game program may be realized only by the hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus for executing a game having a first character and a plurality of second characters appearing therein, comprising:
   a controller;
   first character movement control programmed logic circuitry for controlling a movement of the first character in a game space based on an operation by the controller, and setting first character coordinates corresponding to coordinates of the first character in the game space;
   destination coordinates setting programmed logic circuitry for setting a plurality of destination coordinates in the game space with reference to the first character coordinates set by the first character movement control program logic circuitry;
   correlating programmed logic circuitry for correlating each of the plurality of second characters with different destination coordinates from among the plurality of destination coordinates;
   second character movement control programmed logic circuitry for controlling a movement of each of the plurality of second characters such that each second character moves toward the destination coordinates with which the second character is correlated by the correlating programmed logic circuitry, and setting second character coordinates corresponding to coordinates of the second character in the game space;
   footstep coordinate storage programmed logic circuitry for storing a history of the first character coordinates set by the first character movement control programmed logic circuitry as footstep coordinates; and
   first determination programmed logic circuitry for determining whether or not each second character is able to move toward the destination coordinates with which the second character is correlated by the correlating programmed logic circuitry, and
   wherein the second character movement control programmed logic circuitry moves the second character unable to move toward the destination coordinates, with which the second character is correlated by the correlating programmed logic circuitry, based on the footstep coordinates having been stored by the footstep coordinate storage programmed logic circuitry, instead of moving the second character toward the destination coordinates.

2. The game apparatus according to claim 1,
   wherein the second character movement control programmed logic circuitry moves the second character unable to move toward the destination coordinates with which the second character is correlated by the correlating programmed logic circuitry, toward footstep coordinates closest to a current location of the second character, the footstep coordinates being included in the footstep coordinates stored by the footstep coordinate storage programmed logic circuitry.

3. The game apparatus according to claim 1,
   wherein the footstep coordinate storage programmed logic circuitry stores the footstep coordinates together with time information, and
   wherein, when the second character moving based on the footstep coordinates stored by the footstep coordinate storage programmed logic circuitry arrives at the footstep coordinates, the second character movement control programmed logic circuitry sets footstep coordinates stored by the footstep coordinate storage programmed logic circuitry after the footstep coordinates at which the second character has arrived to destination footstep coordinates, and moves the second character toward the destination footstep coordinates.

4. The game apparatus according to claim 3, further comprising:
   second determination programmed logic circuitry for determining whether or not the second character moving based on the footstep coordinates stored by the footstep coordinate storage programmed logic circuitry is able to move toward the destination footstep coordinates specified by the second character movement control programmed logic circuitry, and
   wherein the second character movement control programmed logic circuitry moves the second character unable to move toward the destination footstep coordinates toward footstep coordinates other than the destination footstep coordinates specified by the second character movement control programmed logic circuitry, the footstep coordinates being stored by the footstep coordinate storage programmed logic circuitry after the footstep coordinates at which the second character has arrived.

5. The game apparatus according to claim 1,
   wherein, when the second character moving based on the footstep coordinates satisfies predetermined requirements, the second character movement control programmed logic circuitry moves the second character toward the destination coordinates.

6. The game apparatus according to claim 1,
   wherein, when the second character moving based on the footstep coordinates is within a predetermined distance from the destination coordinates with which the second character is correlated by the correlating programmed logic circuitry, the second character movement control programmed logic circuitry moves the second character toward the destination coordinates.

7. A computer-readable recording medium for recording a game program causing a computer, which is operably connected to a controller, to execute a game having a first character and a plurality of second characters appearing therein, the game program causing the computer to function as:
   first character movement control programmed logic circuitry for controlling a movement of the first character in a game space based on an operation by the controller, and setting first character coordinates corresponding to coordinates of the first character in the game space;

destination coordinates setting programmed logic circuitry for setting a plurality of destination coordinates in the game space with reference to the first character coordinates set by the first character movement control programmed logic circuitry;

correlating programmed logic circuitry for correlating each of the plurality of second characters with different destination coordinates from among the plurality of destination coordinates;

second character movement control programmed logic circuitry for controlling a movement of each of the plurality of second characters such that each second character moves toward the destination coordinates with which the second character is correlated by the correlating programmed logic circuitry, and setting second character coordinates corresponding to coordinates of the second character in the game space;

footstep coordinate storage programmed logic circuitry for storing a history of the first character coordinates set by the first character movement control programmed logic circuitry as footstep coordinates; and first determination programmed logic circuitry for determining whether or not each second character is able to move toward the destination coordinates with which the second character is correlated by the correlating programmed logic circuitry, and wherein the second character movement control programmed logic circuitry moves the second character unable to move toward the destination coordinates, with which the second character is correlated by the correlating programmed logic circuitry, based on the footstep coordinates having been stored by the footstep coordinate storage programmed logic circuitry, instead of moving the second character toward the destination coordinates.

8. The recording medium according to claim 7,
wherein the second character movement control programmed logic circuitry moves the second character unable to move toward the destination coordinates with which the second character is correlated by the correlating programmed logic circuitry toward footstep coordinates closest to a current location of the second character, the footstep coordinates being included in the footstep coordinates stored by the footstep coordinate storage programmed logic circuitry.

9. The recording medium according to claim 7,
wherein the footstep coordinate storage programmed logic circuitry stores the footstep coordinates together with time information, and
wherein, when the second character moving based on the footstep coordinates stored by the footstep coordinate storage programmed logic circuitry arrives at the footstep coordinates, the second character movement control programmed logic circuitry sets footstep coordinates stored by the footstep coordinate storage programmed logic circuitry after the footstep coordinates at which the second character has arrived to destination footstep coordinates, and moves the second character toward the destination footstep coordinates.

10. The recording medium according to claim 9,
wherein the game program further causes the computer to function as:
second determination programmed logic circuitry for determining whether or not the second character moving based on the footstep coordinates stored by the footstep coordinate storage programmed logic circuitry is able to move toward the destination footstep coordinates specified by the second character movement control programmed logic circuitry, and
wherein the second character movement control programmed logic circuitry moves the second character unable to move toward the destination footstep coordinates toward footstep coordinates other than the destination footstep coordinates specified by the second character movement control programmed logic circuitry, the footstep coordinates being closest to a current location of the second character among the footstep coordinates stored by the footstep coordinate storage programmed logic circuitry after the footstep coordinates at which the second character has arrived.

11. The recording medium according to claim 7,
wherein, when the second character moving based on the footstep coordinates satisfies predetermined requirements, the second character movement control programmed logic circuitry moves the second character toward the destination coordinates.

12. The recording medium according to claim 7,
wherein, when the second character moving based on the footstep coordinates is within a predetermined distance from the destination coordinates with which the second character is correlated by the correlating programmed logic circuitry, the second character movement control programmed logic circuitry moves the second character toward the destination coordinates.

13. A computer implemented method of executing a game having a first character and a plurality of second characters appearing therein, said first character and plurality of second characters for display on a display device, the computer implemented method comprising the steps of:
controlling, via at least one processing device, a movement of the first character in a game space based on a user operation of a controller;
setting first character coordinates corresponding to coordinates of the first character in the game space;
setting a plurality of destination coordinates in the game space with reference to the set first character coordinates;
correlating each of the plurality of second characters with different destination coordinates from among the plurality of destination coordinates;
controlling a movement of each of the plurality of second characters such that each second character moves toward the destination coordinates with which the second character is correlated;
setting second character coordinates corresponding to coordinates of the second character in the game space;
storing a history of the set first character coordinates as footstep coordinates;
determining whether each second character is able to move toward the destination coordinates with which the second character is correlated; and
moving the second character unable to move toward the destination coordinates with which the second character is correlated, based on the footstep coordinates that have been stored, instead of moving the second character toward the destination coordinates.

14. The method according to claim 13, further comprising the step of moving the second character unable to move toward the destination coordinates with which the second character is correlated toward footstep coordinates closest to a current location of the second character, the closest footstep coordinates being included in the stored footstep coordinates.

15. The method according to claim 13, further comprising the steps of:

storing time information associated with the footstep coordinates; and, when the second character moving based on the stored footstep coordinates arrives at the footstep coordinates, setting stored footstep coordinates after the footstep coordinates at which the second character has arrived to destination footstep coordinates and moving the second character toward the destination footstep coordinates.

16. The method according to claim 15, further comprising the steps of:

determining whether the second character moving based on the stored footstep coordinates is able to move toward the destination footstep coordinates, and moving the second character unable to move toward the destination footstep coordinates toward footstep coordinates other than the destination footstep coordinates stored after the footstep coordinates at which the second character has arrived.

17. The method according to claim 13, further comprising the step of moving, when the second character moving based on the footstep coordinates satisfies predetermined requirements, the second character toward the destination coordinates.

18. The method according to claim 13, further comprising the step of moving, when the second character moving based on the footstep coordinates is within a predetermined distance from the destination coordinates with which the second character is correlated, the second character toward the destination coordinates.

19. The method according to claim 13, wherein the destination coordinates for each of the second characters are arranged in a predetermined formation.

* * * * *